United States Patent
Harada et al.

(10) Patent No.: US 7,570,310 B2
(45) Date of Patent: Aug. 4, 2009

(54) METHOD FOR DRIVING OPTICAL ADDRESS TYPE SPATIAL LIGHT MODULATION DEVICE AND APPARATUS FOR DRIVING OPTICAL ADDRESS TYPE SPATIAL LIGHT MODULATION DEVICE

(75) Inventors: Haruo Harada, Kanagawa (JP); Hiroshi Arisawa, Kanagawa (JP); Yasunori Okano, Kanagawa (JP); Makoto Gomyou, Kanagawa (JP); Taiju Gan, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 596 days.

(21) Appl. No.: 11/484,586

(22) Filed: Jul. 12, 2006

(65) Prior Publication Data

US 2007/0085788 A1 Apr. 19, 2007

(30) Foreign Application Priority Data

Oct. 18, 2005 (JP) ............................ P2005-303015

(51) Int. Cl.
*G02F 1/135* (2006.01)
*G02F 1/1347* (2006.01)
*G09G 3/36* (2006.01)
*G02B 26/00* (2006.01)

(52) U.S. Cl. ............................... 349/25; 349/2; 349/29; 349/74; 345/87; 345/97; 359/294

(58) Field of Classification Search ........... 349/2, 349/25, 29, 74, 182–186; 345/87–100, 690–697, 345/204–214; 359/294
See application file for complete search history.

(56) References Cited

U.S. PATENT DOCUMENTS

| 5,504,365 | A | * | 4/1996 | Yamazaki et al. | ............. 345/91 |
| 5,731,797 | A | * | 3/1998 | Akiyama et al. | ............. 345/97 |
| 5,841,489 | A | * | 11/1998 | Yoshida et al. | ............. 349/25 |
| 6,573,953 | B1 | * | 6/2003 | Igasaki et al. | ............. 349/25 |
| 6,882,401 | B2 | | 4/2005 | Harada et al. | |
| 7,190,417 | B2 | * | 3/2007 | Harada et al. | ............. 349/25 |
| 7,511,775 | B2 | * | 3/2009 | Harada et al. | ............. 349/25 |

FOREIGN PATENT DOCUMENTS

JP 2003-140184 5/2003

* cited by examiner

*Primary Examiner*—David L Lewis
(74) *Attorney, Agent, or Firm*—Oliff & Berridge, PLC

(57) ABSTRACT

A method drives a spatial light modulation device to record an image into the device. The device includes first and second light modulation layers. The method includes exposing the device to imagewise light while applying a first voltage between electrodes of the first light modulation layer. If the second light modulation layer has such a characteristic that a curve of an intensity of light, which has the same wavelength as the imagewise light and is applied to the second light modulation layer, versus a reflectivity of the second light modulation layer after finishing applying the light has a local maximum point, an intensity of the imagewise light in the exposing is larger than an intensity, which the curve has at the local maximum point, and in the exposing, the second light modulation layer has a reflectivity lower than a reflectivity, which the curve has at the local maximum point.

19 Claims, 15 Drawing Sheets

PLANER

FOCAL CONIC

HOMEOTROPIC

METHOD FOR DRIVING OPTICAL ADDRESS TYPE SPATIAL LIGHT MODULATION DEVICE AND APPARATUS FOR DRIVING OPTICAL ADDRESS TYPE SPATIAL LIGHT MODULATION DEVICE

BACKGROUND

1. Field

The invention relates to a method for driving an optical address type spatial light modulation device that displays and records an image by using a liquid crystal and a photoconductor.

2. Related Art

There is an increasing expectation for rewritable marking technique as hard copy technique that is replaceable to paper owing to demand on conservation of the global environment including protection of forest resources, and demand on improvement in office environment including space saving.

A reflective liquid crystal display device is receiving attention as a display device for a compact information equipment and a mobile information terminal since it requires no exclusive light source, such as back light, consumes a small amount of electric power, and can be constituted to have a flat and small size.

In particular, a liquid crystal display device utilizing a cholesteric liquid crystal (a chiral nematic liquid crystal) is receiving attention since it has various excellent characteristics, for example, it can undergo writing and erasing by utilizing phase change thereof, and can form a full color image by accumulating liquid crystal layers.

SUMMARY

According to an aspect of the invention, a method drives an optical address type spatial light modulation device to record an image onto the optical address type spatial light modulation device. The optical address type spatial light modulation device includes a first light modulation layer and a second light modulation layer. The first and second first light modulation layers are stacked on each other. Each of the first and second light modulation layers includes a display layer, a photoconductive layer and electrodes. The display layer reflects a predetermined color upon applied a predetermined threshold voltage or more thereto. The photoconductive layer has an optical switching function of absorbing light in a specified wavelength range to change electric characteristics in accordance with an amount of light absorbed. The display layer and the photoconductive layer are stacked on each other. The electrodes are on an outer side of the display layer and on an outer side of the photoconductive layer, respectively. Each photoconductive layer includes a pair of charge generating layers and a charge transporting layer disposed between the charge generating layers. The photoconductive layers of the first and second light modulation layers are different in the specified wavelength range from the photoconductive layer of the third light modulation layers. The method further includes: exposing the optical address type spatial light modulation device to first imagewise light having a wavelength in the specified wavelength range of the first light modulation layer; and applying such a first voltage between the electrodes of the first light modulation layer that a voltage applied to the display layer of the first light modulation layer exceeds a first threshold value, which is the predetermined threshold value of the first light modulation layer upon exposure, and does not exceeds the first threshold value upon non-exposure; and applying a second voltage between the electrodes of the second light modulation layer. The exposing and the first and second voltage applying are done at the same time, and if the second light modulation layer has such a characteristic that a first curve of an intensity of light, which has the same wavelength as the first imagewise light and is applied to the second light modulation layer, versus a reflectivity of the second light modulation layer after finishing applying the light has a first local maximum point, (a) an intensity of the first imagewise light in the exposing is larger than an intensity, which the first curve has at the first local maximum point, and (b) in the exposing, the second light modulation layer has a reflectivity lower than a reflectivity, which the first curve has at the first local maximum point.

BRIEF DESCRIPTION OF THE DRAWINGS

Embodiments of the present invention will be described in detail based on the following figures, wherein:

FIGS. 14A to 14C are illustrative views showing a relationship between the molecular orientation of a cholesteric liquid crystal and the optical characteristics thereof, in which FIG. 14A shows a planer phase, FIG. 14B shows a focal conic phase, and FIG. 14C shows a homeotropic phase;

DETAILED DESCRIPTION

A planer phase exhibited by a cholesteric liquid crystal causes a selective reflection phenomenon, in which light incident in parallel to the helical axis is divided into dextrorotatory light and levorotatory light, a circular polarizing light component agreeing with the twisting direction of the helix is subjected to Bragg reflection, and the remaining light is transmitted. The center wavelength λ of the reflected light and the reflection wavelength width Δλ are expressed by the following equations:

$$\lambda = n \cdot p$$

$$\Delta\lambda = \Delta n \cdot p$$

where p represents the pitch of the helix, n represents the average refractive index in the plane perpendicular to the helical axis, and Δn represents the birefringence index, and light reflected by a cholesteric liquid crystal layer having a planer phase exhibits a bright color depending on the pitch of the helix.

Figure 14A:
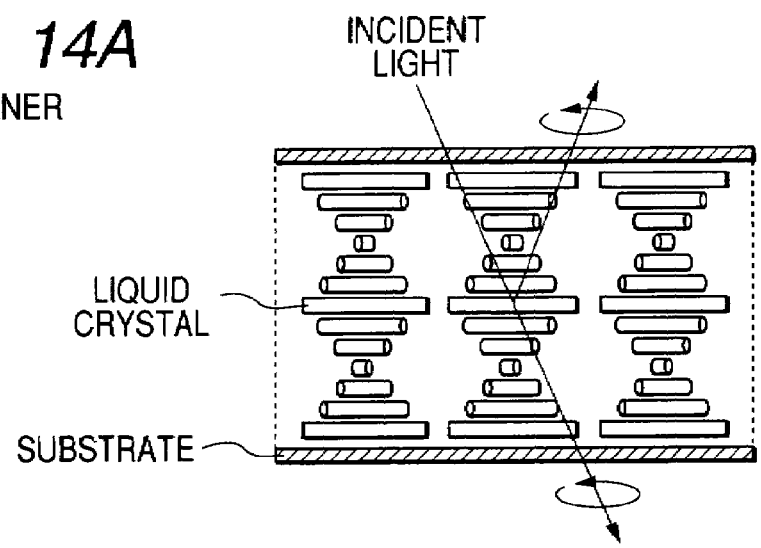
Figure 14B:
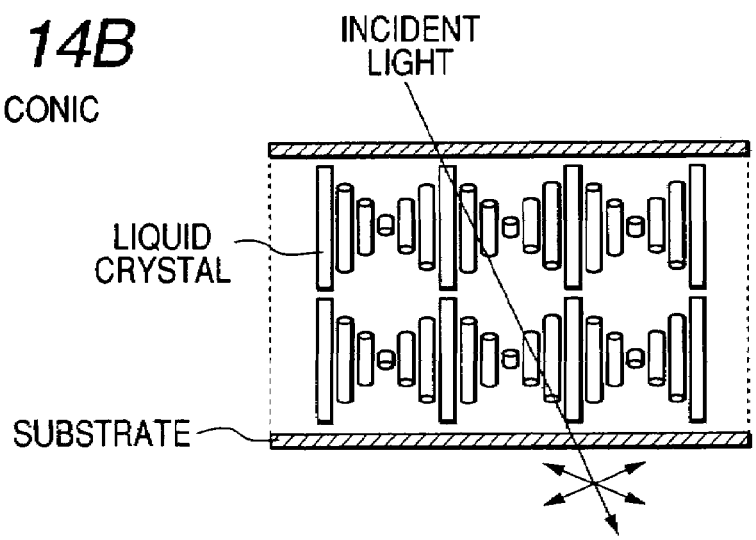
Figure 14C:
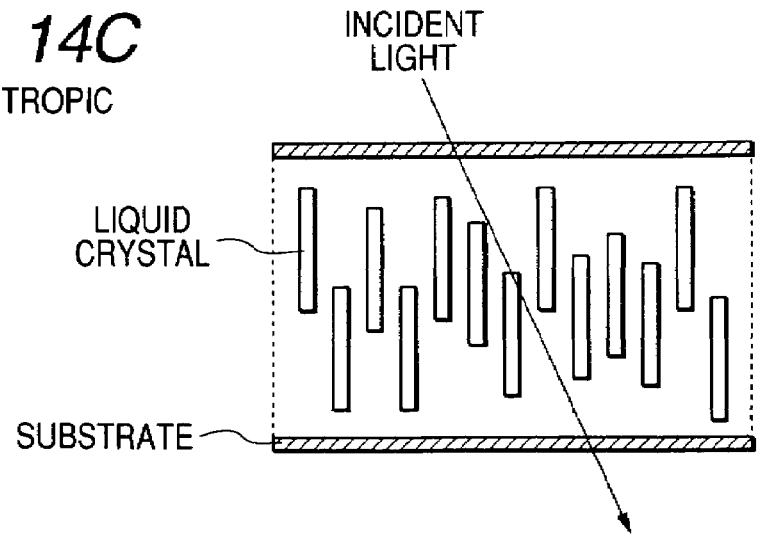

A cholesteric liquid crystal having a positive dielectric anisotropy exhibits three states, i.e., a planer phase, in which the helical axis is perpendicular to the cell surface to exhibit the aforementioned selective reflection phenomenon to incident light as shown in FIG. 14A, a focal conic phase, in which the helical axis is substantially in parallel to the cell surface to transmit incident light with a little forward scattering as shown in FIG. 14B, and a homeotropic phase, in which the helical structure is unraveled, and the liquid crystal director is directed to the direction of the electric field, to transmit incident light substantially completely as shown in FIG. 14C.

Among the three states, the planer phase and the focal conic phase can be present bistably under no electric field. Therefore, the phase state of the cholesteric liquid crystal is not determined primarily with respect to the intensity of the electric field applied to the liquid crystal layer, and in the case where the initial state is a planer phase, the state is changed with increase in electric field intensity to a planer phase, a focal conic phase and a homeotropic phase in this order, and in the case where the initial state is a focal conic phase, the state is changed with increase in electric field intensity to a focal conic phase and a homeotropic phase in this order.

In the case where the intensity of the electric field applied to the liquid crystal layer is made suddenly zero, a planer phase and a focal conic phase are maintained as they are, but a homeotropic phase is changed to a planer phase.

Figure 15:
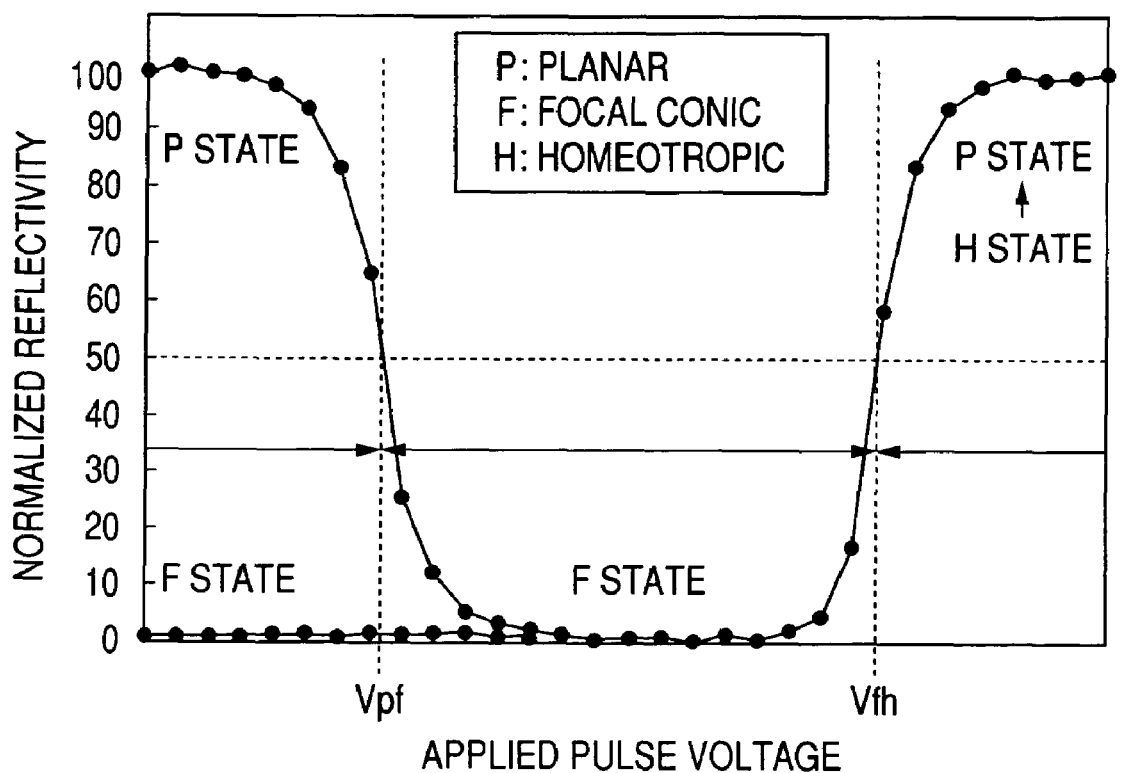
FIG. 15 is a graph showing a switching behavior of a cholesteric liquid crystal.

Therefore, a cholesteric liquid crystal layer immediately after applying a pulse signal exhibits a switching behavior as shown in FIG. 15, and exhibits the selective reflection state with change from a homeotropic phase to a planer phase when the pulse signal applied is Vfh or more, the transmission state by a focal conic phase when the pulse signal is between Vpf and Vfh, and maintains the state before applying the pulse signal, i.e., the selective reflection state by a planer phase or the transmission state by a focal conic phase when the pulse signal is Vpf or less.

In FIG. 15, the ordinate is the normalized light reflectivity, in which the light reflectivity is normalized with the maximum light reflectivity being 100 and the minimum light reflectivity being 0. Since there are transition region between the planer phase, the focal conic phase and the homeotropic phase, the case where the normalized light reflectivity is 50 or more is designated as the selective reflection state, the case where the normalized light reflectivity is less than 50 is designated as the transmission state, the threshold voltage of the phase change from the planer phase and the focal conic phase is designated as Vpf, and the threshold voltage of the phase change from the focal conic phase and the homeotropic phase is designated as Vfh.

Particularly, in a liquid crystal layer having a PNCL (polymer network liquid crystal) structure containing a network resin in a continuous phase of a cholesteric liquid crystal, and a liquid crystal layer having a PDLC (polymer dispersed liquid crystal) structure containing a cholesteric liquid crystal dispersed into droplets in a polymer skeleton (including microencapsulation), the bistability of a planer phase and a focal conic phase under no electric field is improved by interference at an interface between the cholesteric liquid crystal and the polymer (anchoring effect), whereby the state immediately after applying a pulse signal can be maintained for a long period of time.

The optical address type spatial light modulation device using the technique exerts switching between (A) a selective reflection state by a planer phase and (B) a transmission state by a focal conic phase by utilizing the bistability of the cholesteric liquid crystal, so as to realize monochrome display of black and white with memory effect under no electric field or color display with memory effect under no electric field.

The inventors have disclosed, as an optical address type spatial light modulation device utilizing the aforementioned technique, such a technique that plural optical address type light modulation layers, each of which contains a display layer containing a cholesteric liquid crystal and a photoconductive layer, such as an organic photoconductor (OPC) layer, stacked on each other, are stacked to enable simultaneous and individual control of the reflection states of the plural layers, whereby a mixed color image having plural colors can be formed by a single writing operation (as disclosed in Patent Document 1). According to the technique, display layers capable of selectively reflecting three colors, for example, red (R), green (G) and blue (B), respectively are stacked to form simply a full color image by a single writing operation.

Figure 16:
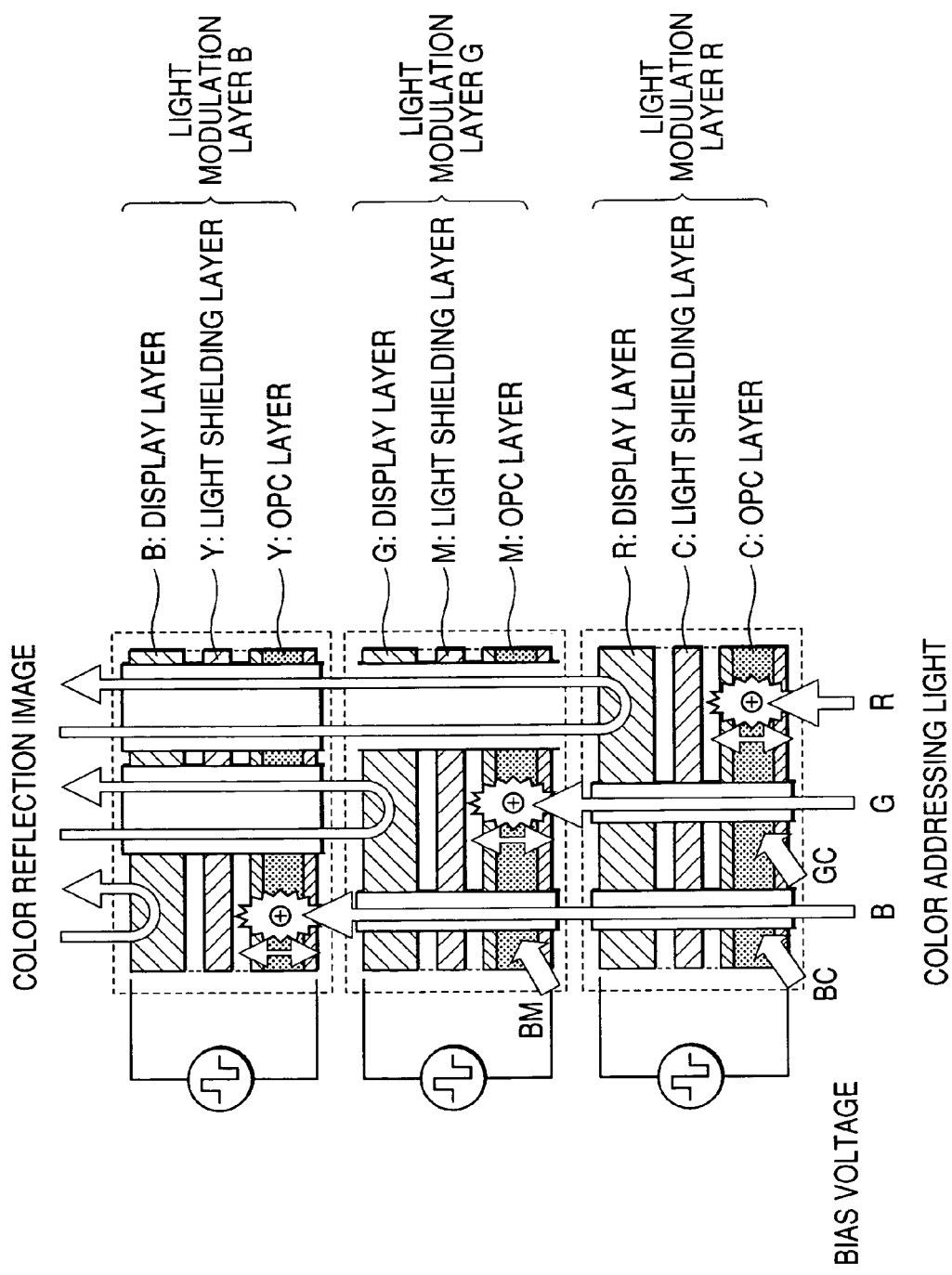
FIG. 16 is a schematic diagram showing driving an optical address type spatial light modulation device having three light modulation layers stacked.

FIG. 16 is a schematic diagram showing an operation of an optical address type spatial light modulation device utilizing the aforementioned technique. The optical address type spatial light modulation device has three light modulation layers (optical address type light modulation layers) stacked on each other, in which the optical address type light modulation layer has a display layer (liquid crystal layer) and an OPC layer (photoconductive layer) stacked with a light shielding layer intervening between them, and has electrode layers (which are not shown in FIG. 16) disposed outside the layers.

In FIG. 16, the light modulation layer R as the lowermost layer contains a display layer reflecting R light, a cyan (C) light shielding layer C absorbing R light, and an OPC layer (C) absorbing R light and changing in resistance corresponding to the amount of the R light absorbed, and is constituted to be capable of forming an image of a R color component in total.

The light modulation layer G as the intermediate layer contains a display layer reflecting G light, a magenta (M) light shielding layer M absorbing G light, and an OPC layer (M) absorbing G light and changing in resistance corresponding to the amount of the G light absorbed, and is constituted to be capable of forming an image of a G color component in total.

The light modulation layer B as the uppermost layer contains a display layer reflecting B light, a yellow (Y) light shielding layer Y absorbing B light, and an OPC layer (Y) absorbing B light and changing in resistance corresponding to the amount of the B light absorbed, and is constituted to be capable of forming an image of a B color component in total.

In other words, the reflected color of the display layer and the transmitted color of the light shielding layer and the OPC layer are in a relationship of complementary colors in each light modulation layer.

Upon irradiating each the light modulation layer with color addressing light while applying a bias voltage, addressing light of B color is transmitted through the light modulation layer R and the light modulation layer G with no action on operations of the light modulation layer R and the light modulation layer G, but is absorbed by the OPC layer (Y) of the light modulation layer B and operates the display layer to change the liquid crystal to a reflection state, whereby a reflection image of B color is formed. The addressing light not completely absorbed but remaining is shielded with the light shielding layer (Y) of the light modulation layer B and thus exerts no influence on the displayed image.

Addressing light of G color is transmitted through the light modulation layer R with no action on an operation of the light modulation layer R, but is absorbed by the OPC layer (M) of the light modulation layer G and operates the display layer to change the liquid crystal to a reflection state, whereby a reflection image of G color is formed. The addressing light not completely absorbed but remaining is shielded with the light shielding layer (M) of the light modulation layer G and thus exerts no influence on an operation of the light modulation layer G as an upper layer and the displayed image.

Addressing light of R color is absorbed by the OPC layer (C) of the light modulation layer R and operates the display layer to change the liquid crystal to a reflection state, whereby a reflection image of R color is formed. The addressing light not completely absorbed but remaining is shielded with the light shielding layer (C) of the light modulation layer R and thus exerts no influence on operations of the light modulation layer G and the light modulation layer B as upper layers and the displayed image.

Accordingly, the display layers of the light modulation layers of the three colors are driven by irradiating with addressing light of the three colors simultaneously, whereby a full color reflection image is formed on the upper surface shown in the figure.

According to this technique, for example, in the constitution shown in FIG. 16, it is the necessary condition that the addressing light of B color is transmitted through the light modulation layer R and the light modulation layer G and reaches the OPC layer (Y) of the light modulation layer B, and the addressing light of G color is transmitted through the light modulation layer R and reaches the OPC layer (M) of the light modulation layer G. In practical, however, there is some absorption in the OPC layers of the light modulation layers on the side of the exposure surface (shown in the figure with the arrows BC, BM and GC).

Figure 17:
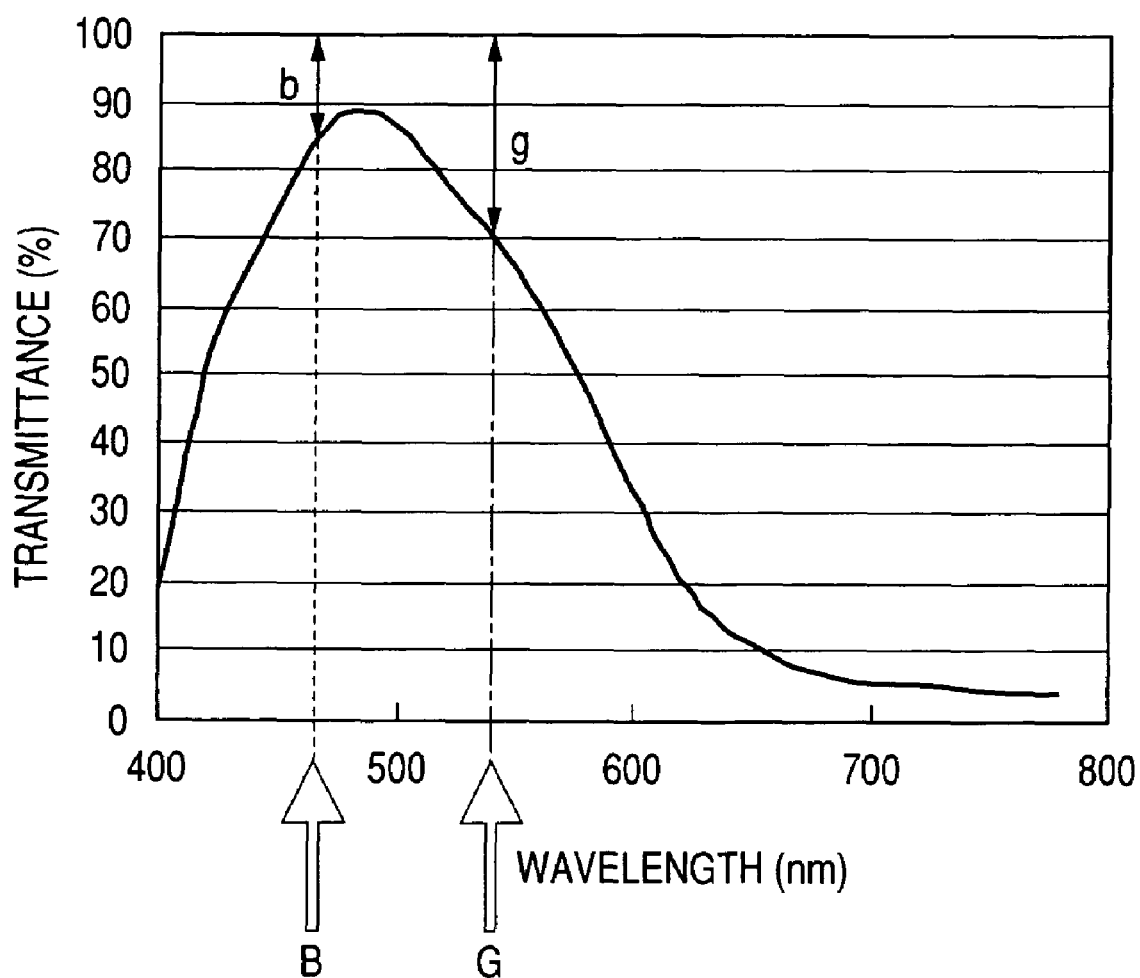
FIG. 17 is a graph showing a transmission spectrum of light in an OPC layer (photoconductive layer) of a light modulation layer of R color.

FIG. 17 is a graph showing a transmission spectrum of light in the OPC layer (C) of the light modulation layer R. In FIG. 17, the abscissa is the wavelength of the light, and the ordinate is the transmittance of the light. The wavelengths of the addressing light of B color and the addressing light of G color are shown with the arrows. As is understood from the graph, the transmittances of the addressing light are not 100%, but there are absorptions by the OPC layer (C) in amounts corresponding to the segment b for the addressing light of B color and the segment g for the addressing light of G color. In other words, since the OPC layer has a broad spectrum as shown in FIG. 17, the addressing light, which should not be absorbed, is actually absorbed slightly.

As a result, erroneous optical address type operations may occur with the addressing light of the other colors to cause unexpected color mixture among the images of the respective colors (herein after, the color mixing phenomenon is referred to as "crosstalk").

In the exemplary embodiments, the characteristic nature of the photoconductive layers (which are ordinarily referred to as OPC layer (organic photoconductive layer)) of the optical address type light modulation layers stacked is utilized to prevent deterioration of color reproducibility due to crosstalk. In other words, in the case where a photoconductive layer has a three-layer structure containing a pair of charge generating layers and one charge transporting layer intervening there between, and the pair of charge generating layers exhibit wavelength dispersion in an absorption spectrum (i.e., the charge generating layers have colors) and is adjusted to exhibit impedance symmetry upon irradiating the photoconductive layer with light having the specified wavelength to be absorbed from a prescribed one side, the photoconductive layer has such a nature that the photoconductive layer necessarily exhibits in principle impedance asymmetry with respect to light not having the specified wavelength.

Figure 1:
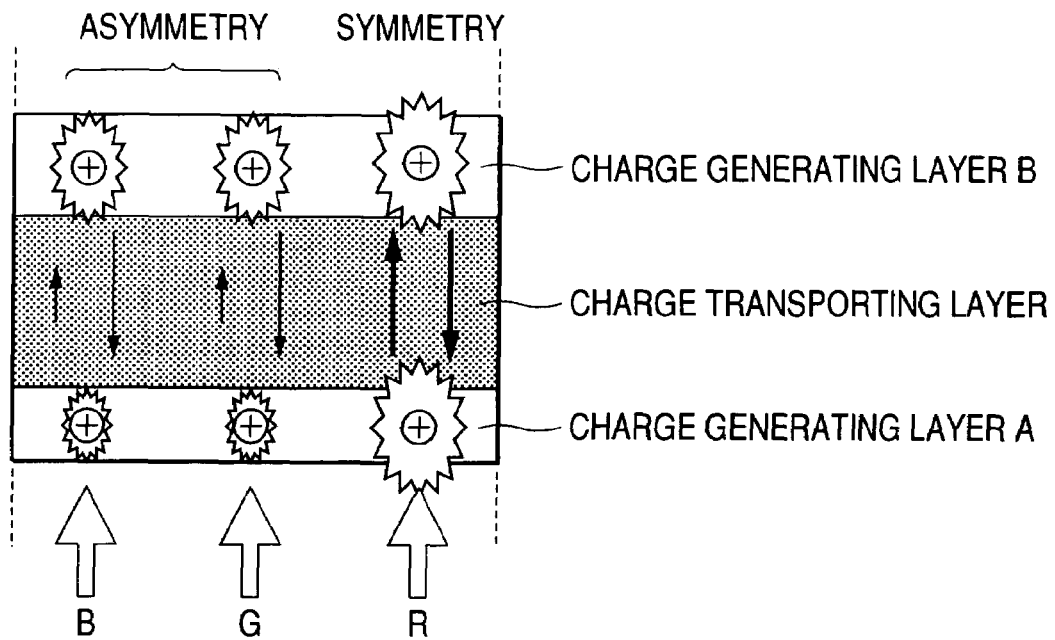
FIG. 1 is a schematic illustration showing impedance symmetry and impedance asymmetry with respect to light of three colors in a photoconductive layer having the three-layer structure.

FIG. 1 is a schematic illustration showing impedance symmetry and impedance asymmetry with respect to light of three colors in a photoconductive layer having the three-layer structure. FIG. 1 shows an example where light of R color is absorbed to exhibit an optical switching function. The photoconductive layer shown in FIG. 1 has a charge generation layer (CGL) A, a charge transporting layer and a charge generation layer B stacked in this order from the side of the exposure surface. Photo carriers are generated in the charge generating layer A and the charge generating layer B, and the photo carriers generated in either layer penetrate to the charge transporting layer depending on the direction of the electric field to cause hopping movement in the charge generating layers, whereby the resistance of the photoconductive layer is lowered to exhibit an optical switching function of alternating current.

Upon irradiating the photoconductive layer with light of R color from the exposure surface, the light is absorbed by the charge generating layer A to generate photo carriers. The light of R color is then absorbed by the charge generating layer B to generate photo carriers similarly. However, the light reaching the charge generating layer B is decreased in intensity of light (light amount) since the charge generating layer A has absorbed the light. Assuming that the absorbance to the light of R color of the charge generating layer A is the same as that of the charge generating layer B, the absorbed amount of light of the charge generating layer B is smaller than that of the charge generating layer A to break the balance. Consequently, in the case where the charge generating layer A and the charge generating layer B are formed with layers having the same characteristics, the amount of photo carriers thus generated in the charge generating layer B becomes smaller than that in the charge generating layer A to break the balance.

In an ordinary OPC layer for light of R color, in order to maintain the balance, the amounts of photo carriers generated in the charge generating layers A and B are controlled to be substantially the same as each other, for example, by such a manner that the absorbance to the light of R color of the charge generating layer B is increased as compared to the charge generating layer A, or the charge generating layer B is designed to generate a larger amount of photo carriers as compared to the charge generating layer A upon absorbing light having the same intensity. The state of the pair of charge generating layers having been controlled in this manner is referred to as impedance symmetry herein.

The photoconductive layer shown in FIG. 1 is designed to exhibit impedance symmetry to light of R color. Accordingly, upon irradiating the photoconductive layer with light of R color from the exposure surface, the charge generating layer A and the charge generating layer B generate photo carriers in substantially the same amount, and the photo carriers move reciprocally in the charge transporting layer in a balanced manner to reduce the resistance, whereby a symmetrical alternating current switching function is exhibited.

However, in the case where the charge generating layers exhibit wavelength dispersion in an absorption spectrum (i.e., the charge generating layers are non-constant in absorption constant with respect to wavelength to have colors), the photoconductive layer having been controlled to exhibit impedance symmetry to light of R color as shown in FIG. 1 cannot be designed to exhibit a symmetrical absorbance ratio between the charge generating layers to the entire wavelength range, and thus does not necessarily exhibits in principle impedance symmetry to light of B color and light of G color. The state where no impedance symmetry is exhibited is referred to as impedance asymmetry herein. In the case where impedance asymmetry is exhibited as shown by the pairs of arrows shown in FIG. 1 for light of B color and light of G color, the amount of photo carriers in the charge transporting layer varies depending on the direction of the electric field.

Figure 2:
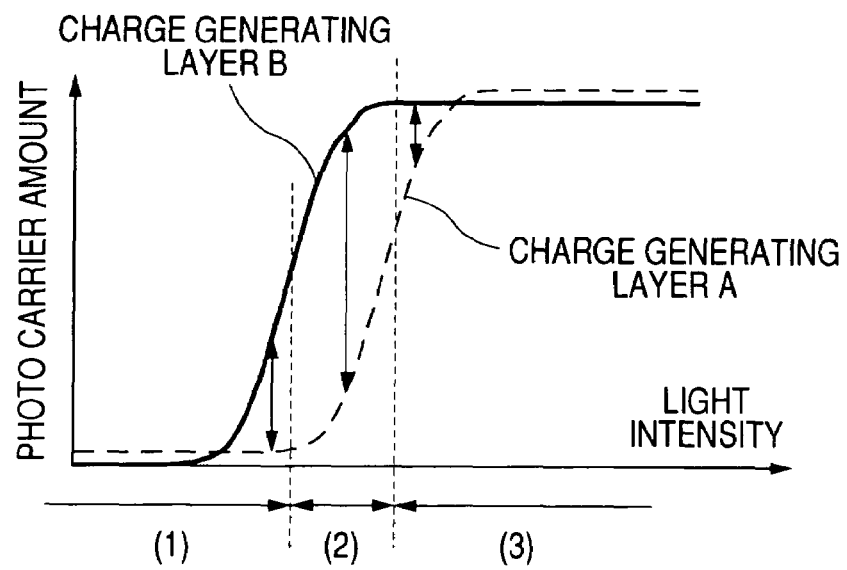
FIG. 2 is a graph showing change of a conductivity of one photoconductive layer while applying an electric field in such a direction that only one of the charge generating layers is operated.

FIG. 2 is a graph showing change of a conductivity of one photoconductive layer with respect to the light intensity of addressing light for exposing the other photoconductive layers than the photoconductive layer (i.e., light of B color or G color in FIG. 1, which is referred herein after to as non-addressing light in some cases) while applying an electric field in such a direction that only one of the charge generating layers is operated. It is understood from FIG. 2 that the electric characteristics of the photoconductive layers are shifted to the non-addressing light depending on the application direction of the electric field.

That is, there is no large divergence in conductivity depending on the direction of the electric field in the region (1) with a weak light intensity and the region (3) with a sufficiently large light intensity, but three is transiently a significantly large divergence in conductivity in charge generating layers A and B in the region (2) with the intermediate light intensity. This is a phenomenon that occurs since in the direction of the electric field applied to the charge generating layer B rather than the charge generating layer A, the increase in conductivity tardily occurs with respect to the increase of the light intensity of the non-addressing light (i.e., there is a shift in conductivity).

Figure 3:
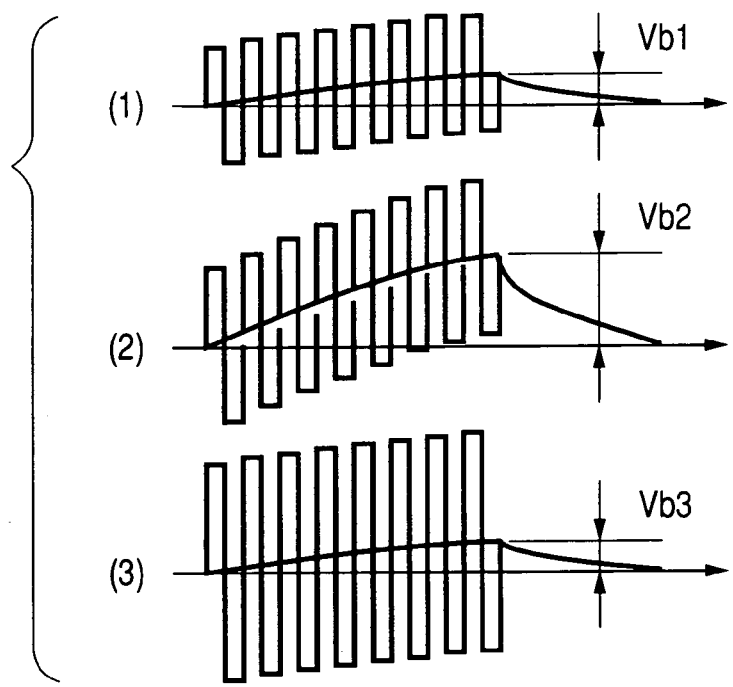
FIG. 3 is a time-series chart showing a voltage (divided voltage) applied to a liquid crystal layer when the liquid crystal layer is irradiated with non-addressing light having light intensities in regions (1) to (3) shown in FIG. 2 while applying a prescribed electric field.

FIG. 3 is a time-series chart showing the voltage (divided voltage) applied to a liquid crystal layer when the liquid crystal layer is irradiated with non-addressing light with light intensities in the regions (1) to (3) while applying a prescribed electric field. It is understood from FIG. 3 that while the voltage applied to the liquid crystal layer is biased in all the regions, the voltage is largely biased in the region (2) with large impedance asymmetry as compared to the regions (1) and (3).

Accordingly, the voltage applied to the liquid crystal layer is largely biased with increase in light intensity (from the region (1) to the region (2)), and when the light intensity reaches saturation, the bias voltage is again decreased. It is understood from FIG. 3 that upon terminating irradiation with the non-addressing light, bias voltages Vb1, Vb2 and Vb3 are formed and remain in the regions (1), (2) and (3), respectively, and the bias voltage Vb2 in the region (2) is larger than the bias voltages Vb1 and Vb3 in the other regions (1) and (3).

Figure 4:
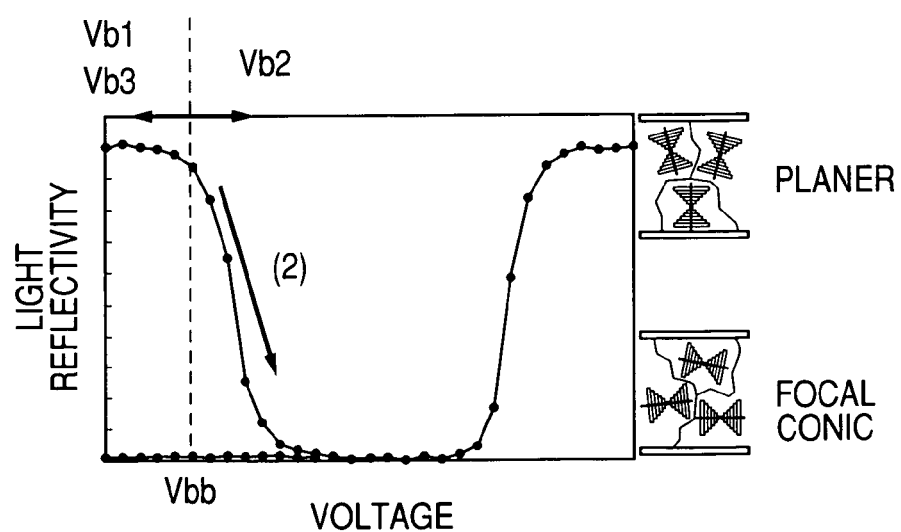
FIG. 4 is a graph showing a relationship between the bias voltage caused by impedance asymmetry and the light reflectivity of the liquid crystal layer finally stabilized, after terminating application of voltage and irradiation with non-addressing light.

FIG. 4 is a graph showing a relationship between the bias voltage based on impedance asymmetry and the light reflectivity of the liquid crystal layer finally stabilized, after terminating application of voltage and irradiation with non-addressing light. The graph indicates the final state that the written state obtained by irradiation with non-addressing light (homeotropic phase) reaches by the bias voltage remaining after terminating application of voltage and irradiation with non-addressing light.

It is understood from the graph of FIG. 4 that when the voltage exceeds the boundary voltage Vbb in the figure, the written state obtained by irradiation with non-addressing light (homeotropic phase) is changed to a focal conic phase. In the case where the voltage does not exceeds the boundary voltage Vbb in the figure, a liquid crystal in a homeotropic phase is generally changed to a planer phase finally after terminating application of voltage, but in the case where the voltage exceeds the boundary voltage Vbb, the homeotropic phase is changed to a focal conic phase rather than a planer phase.

The bias voltage Vb2 formed in the region (2) exceeds the boundary voltage Vbb, and the homeotropic phase is changed to a focal conic phase. Accordingly, even in the case where unintended phase change to a homeotropic phase occurs due to crosstalk caused by non-addressing light (and, in the ordinary case, the homeotropic phase is then changed to a planer phase to cause erroneous writing of an image), a focal conic phase is retrieved in the region (2) by the bias voltage Vb2 remaining after terminating application of voltage and irradiation with non-addressing light, whereby such a state appears that there is no influence of the non-addressing light.

Figure 5:
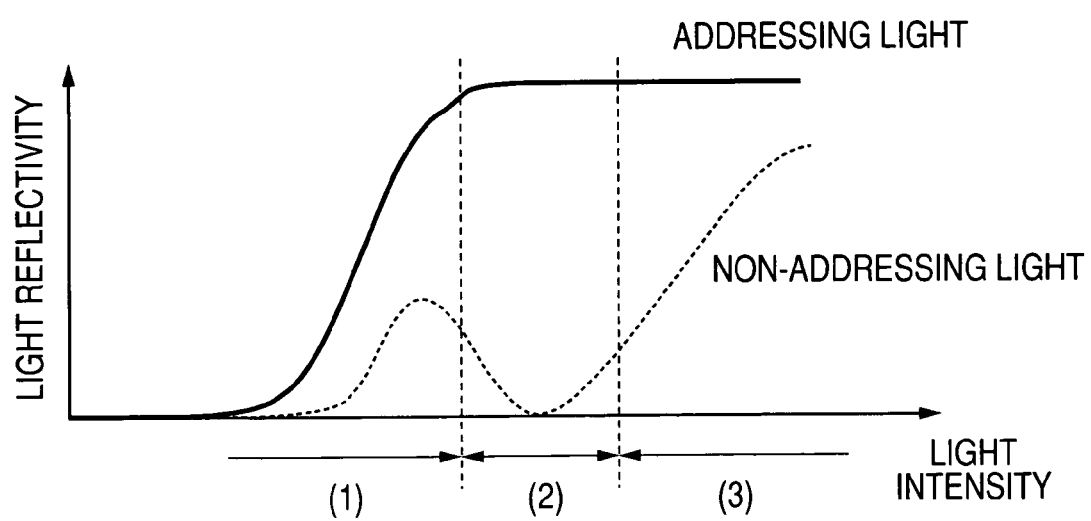
FIG. 5 is a graph showing a relationship between (a) the light intensities of addressing light and non-addressing light and (b) a light reflectivity of the liquid crystal layer after terminating application of voltage and irradiation with addressing light and non-addressing light.

The aforementioned phenomena derive the results shown in FIG. 5. FIG. 5 is a graph showing a relationship between the light intensities of addressing light and non-addressing light and the light reflectivity of the liquid crystal layer after terminating application of voltage and irradiation with addressing light and non-addressing light. In the graph, the addressing light is indicated with the solid line, and the non-addressing light is indicated with the broken line.

In an optical address type spatial light modulation device having an optical address type light modulation layer with a photoconductive layer having the three-layer structure, as shown in FIG. 5, upon irradiation with addressing light, the light reflectivity is gradually increased until saturation with increase of the light intensity, but upon irradiation with non-addressing light, there is such a tendency that the light reflectivity is gradually increased firstly, then once decreased, and again increased to reach saturation. The region of light intensity where the light reflectivity gradually increased is once decreased corresponds to the region (2), the region lower in light intensity than the region (2) corresponds to the region (1), and the region higher in light intensity than the region (2) corresponds to the region (3).

By using such a light intensity that corresponds to the region (2) as the intensity of addressing light, the optical address type light modulation layer directed to irradiation with the addressing light provides sufficient light reflection owing to the phase change, and the addressing light functions as non-addressing light to the other optical address type light modulation layers to prevent phase change from occurring to suppress light reflection.

Herein, the region (2) may be referred to as a "particular range". That is, the light intensity of the addressing light is set within the "particular range", and the other optical address type light modulation layers can be free of influence of the light, which is non-addressing light to the other layers, whereby the problem of crosstalk can be eliminated or reduced.

For example, referring to the example shown in FIG. 16, the light intensities of the addressing light of B color and/or the addressing light of G color are set within the "particular ranges" of the light modulation layer (photoconductive layer) G and/or the light modulation layer (photoconductive layer) R in the parts shown by the arrows BC, BM and GC suffering from a problem of crosstalk, whereby the problem of crosstalk in these parts can be eliminated or reduced.

The "particular range" designates such a range that the final light reflectivity of at least one of the other optical address type light modulation layers than the optical address type light modulation layer directed to irradiation with addressing light, which is gradually increased with respect to increase of the light intensity, is firstly decreased. The term "decreased" in the language "which is gradually increased, is firstly decreased" herein not only means a region having an evident bottom in light reflectivity, such as the region (2) in FIG. 5, but also includes a region having such a graph that gradual increase is once attenuated without an evident bottom.

In the case where there is an evident bottom in light reflectivity, the "particular range" is preferably a vicinity of the bottom, i.e., a range where the light reflectivity becomes a minimum value or a vicinity thereof. The minimum value appearing on a graph can be realized by appropriately controlling the selection and mixing ratios of the materials for the respective layers of the photoconductive layer, the thicknesses of the layers, and the spectra of light radiated.

The term "firstly" in the language "which is gradually increased, is firstly decreased" defining the "particular range" is used to exclude attenuation of light reflectivity upon saturation in the region (3) with high light intensity.

Exemplary embodiments of the invention will be further described in detail with reference to the drawings.

Figure 6:
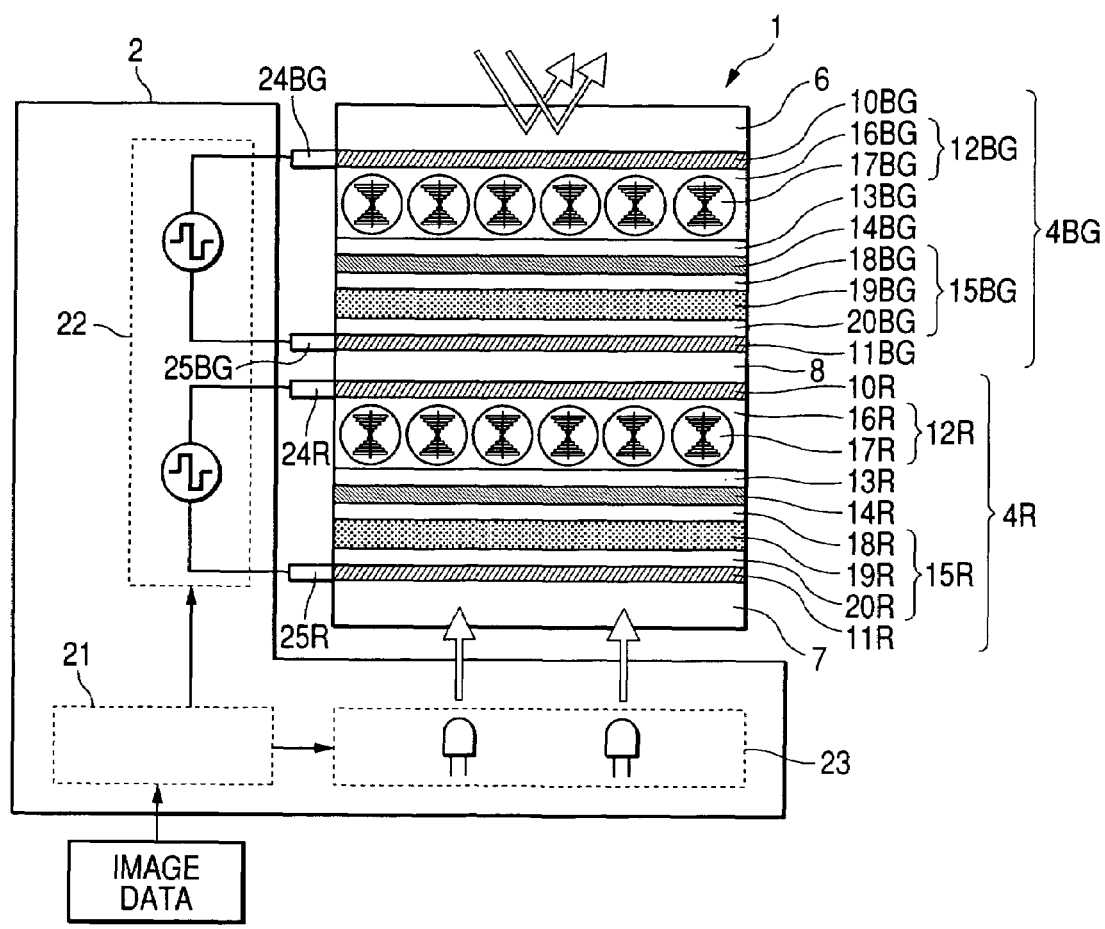
FIG. 6 is a schematic constitutional view showing an exemplary embodiment of a system, to which the method for driving an optical address type spatial light modulation device according to the exemplary embodiment of the invention is applied.

FIG. 6 is a schematic constitutional view showing an exemplary embodiment of a system, to which the method for driving an optical address type spatial light modulation device according to the exemplary embodiment is applied. The system of the exemplary embodiment contains a display medium (optical address type spatial light modulation device) 1 and a writing apparatus (driving apparatus of optical address type spatial light modulation device) 2. These constitutional components will be described in detail, and then the operations thereof will be described.

(Display Medium)

The display medium in the exemplary embodiment is such a member that can undergo an addressing operation through irradiation with addressing light and application of a bias signal, and is specifically an optical address type spatial light modulation device.

In the exemplary embodiment, the display medium 1 contains an external substrate 6, a light modulation layer 4BG, an internal substrate 8, a light modulation layer 4R and an external substrate 7, which are stacked in this order from a display surface.

The two light modulation layers 4BG and 4R each contains transparent electrodes (electrodes) 10BG and 10R, display layers (liquid crystal layers) 12BG and 12R, laminate layers 13BG and 13R, light shielding layers 14BG and 14R, OPC layers (photoconductive layers) 15BG and 15R, and transparent electrodes (electrodes) 11BG and 11R, which are stacked in this order from the display surface.

The constitutional members will be described respectively.

(External Substrate and Internal Substrate)

The external substrates 6 and 7 and the internal substrate 8 are members for maintaining the functional layers inside and retaining the structure of the display medium. The substrates are members in a sheet form having such a strength that withstands external forces. The external substrate 6 on the display surface transmits at least incident light, the external substrate 7 on a writing surface transmits at least addressing light, and the internal substrate 8 transmits at least incident light and addressing light. The substrates preferably have flexibility.

Specific examples of a material for the substrates include an inorganic sheet (such as glass and silicon) and a polymer film (such as polyethylene terephthalate, polysulfone, polyethersulfone, polycarbonate and polyethylenenaphthalate). The external substrates 6 and 7 may have formed on an outer surface thereof a known functional film, such as an antifouling film, an antiwear film, an antireflection film and a gas barrier film.

(Light Modulation Layer)

The two light modulation layers 4BG and 4R have the same specific constitution but are appropriately controlled in selection of materials in such a manner that the display color (color of light reflected by the liquid crystal) or a driving color (color of light absorbed by the OPC layer) becomes the set values thereof. The same specific constitution will be described. In the following description, in the case where no alphabetical symbol (BG or R) is attached to the numerical symbol, the description is to be commonly applied to both the two light modulation layers 4BG and 4R.

(Transparent Electrode)

The transparent electrodes 10 and 11 are members for applying a bias voltage applied from the writing apparatus 2 plane-uniformly to the functional layers in the display medium 1. The transparent electrodes 10 and 11 have plane-uniform conductivity and transmit at least incident light and addressing light. Specific examples thereof include an electroconductive thin film formed of a metal (such as gold and aluminum), a metallic oxide (such as indium oxide, tin oxide and indium tin oxide (ITO)), and an electroconductive organic polymer (such as a polythiophene polymer and a polyaniline polymer). The transparent electrodes 10 and 11 may have formed on the surface thereof a known functional film, such as an adhesion improving film, an antireflection film and a gas barrier film.

(Display Layer)

The display layer (liquid crystal layer) is a layer having such a function that the reflection and transmission state to light of a particular color of incident light is modulated by an electric field, and the selected state is maintained under no electric field. The display layer preferably has such a structure that is not deformed due to an external force, such as a bending force and a compression force.

In this embodiment, a liquid crystal layer of a self-retaining liquid crystal composite containing a cholesteric liquid crystal and a transparent resin is used as an example of the display layer. This is a liquid crystal layer that requires no member for retaining the shape, such as a spacer, since it has self-retaining property as a composite. In the exemplary embodiment, as shown in FIG. 6, a cholesteric liquid crystal 17 is dispersed in a polymer matrix (transparent resin) 16.

The cholesteric liquid crystal 17 has such a function that the reflection and transmission state to light of a particular color of incident light is modulated, in which liquid crystal molecules are oriented with twist in a helical form, and light of a particular color depending on the helical pitch of the light incident in parallel to the helical axis is interference-reflected. The orientation state is changed depending on the electric field to change the reflection state. The cholesteric liquid crystal 17 preferably has a uniform droplet size and arranged in a dense monolayer form.

Specific examples of a liquid crystal capable of being used as the cholesteric liquid crystal 17 include a steroid cholesterol derivative, a nematic or smectic liquid crystal (such as those of a Schiff's base compound, an azo compound, an azoxy compound, a benzoate ester compound, a biphenyl compound, a terphenyl compound, a cyclohexylcarboxylate ester compound, a phenylcyclohexane compound, a biphenylcyclohexane compound, a pyrimidine compound, a dioxane compound, a cyclohexylcyclohexane ester compound, a cyclohexylethane compound, a cyclohexane compound, a tolan compound, an alkenyl compound, a stilbene compound and a condensed polycyclic compound), and a mixture thereof containing a chiral agent (such as a steroid cholesterol derivative, a Schiff's base compound, an azo compound, an ester compound and a biphenyl compound).

The helical pitch of the cholesteric liquid crystal is controlled by the chemical structure of the liquid crystal molecule and the addition amount of the chiral agent to the nematic liquid crystal. In the case where the display color is blue green (BG) or red (R) in the exemplary embodiment, the center wavelengths of selective reflection of the layers are in ranges of from 400 to 600 nm and from 600 to 700 nm, respectively. In order to compensate the temperature dependency of the helical pitch of the cholesteric liquid crystal, such a known measure may be employed that plural chiral agents having different twist directions or opposite temperature dependencies are added.

Examples of the constitution of the display layer 12 where the cholesteric liquid crystal 17 and the polymer matrix (transparent resin) 16 form a self-retaining liquid crystal composite include PNLC (polymer network liquid crystal) structure, in which a continuous phase of a cholesteric liquid crystal contains a resin in a network form, and PDLC (polymer dispersed liquid crystal) structure, in which a cholesteric liquid crystal is dispersed in a droplet form in a polymer skeleton (which include those microencapsulated). In the PNLC structure and the PDLC structure, particularly, an anchoring effect is obtained at an interface between the cholesteric liquid crystal and the polymer, whereby the maintained state of a planer phase or a focal conic phase under no electric field can be further stabilized.

The PNLC structure and the PDLC structure can be formed by a known method of separating a polymer and a liquid crystal, examples of which will be described below, but the invention is not limited thereto. For example, in a PIPS (polymerization induced phase separation) method, a polymer precursor capable of being polymerized with heat, light or an electron beam, such as an acrylic compound, a thiol compound and an epoxy compound, is mixed with a liquid crystal, and the resulting uniform phase is polymerized to cause phase separation. In an emulsion method, a polymer having a low solubility of a liquid crystal, such as polyvinyl alcohol, is mixed with a liquid crystal to obtain a suspension liquid, and the liquid crystal is dispersed in a droplet form in the polymer. In a TIPS (thermally induced phase separation) method, a thermoplastic resin is mixed with a liquid crystal, and the resulting heated uniform phase is cooled to cause phase separation. In an SIPS (solvent induced phase separation) method, a polymer and a liquid crystal are dissolved in a solvent, such as chloroform, and the solvent is then evaporated to case phase separation of the polymer and the liquid crystal.

The polymer matrix 16 has such a function that the cholesteric liquid crystal 17 is retained to suppress flowage of the liquid crystal (change of an image) due to deformation of the display medium 1, and a polymer material that is not dissolved in a liquid crystal material and is dissolved in a solvent having no compatibility with a liquid crystal is preferably used. The polymer matrix 16 is preferably a material having a strength withstanding external forces and high transparency to reflected light and addressing light.

Examples of the material capable of being employed as the polymer matrix 16 include a water-soluble polymer material (such as gelatin, polyvinyl alcohol, a cellulose derivative, a polyacrylic acid polymer, ethylene imine, polyethylene oxide, polyacrylamide, polystyrenesulfonate salt, polyamidine and an isoprene sulfonic acid polymer), and a material capable of forming an aqueous emulsion (such as a fluorine resin, a silicone resin, an acrylic resin, a urethane resin and an epoxy resin).

(OPC Layer)

The OPC layer (photoconductive layer) 15 is such a layer that a voltage applied to the display layer 12 is modulated based on an addressing light pattern radiated from the writing apparatus 2, and the layer has an internal photoelectric effect and such characteristics that the impedance characteristics thereof are changed corresponding to the irradiation intensity of the addressing light. The OPC layer can be operated with AC and is controlled to exhibit impedance symmetry to addressing light and impedance asymmetry to non-addressing light as having been described.

It is necessary that the OPC layer has the three-layer structure containing charge generating layers (CGL) are stacked on both sides of a charge transporting layer (CTL) as in the exemplary embodiment. In the OPC layer 15 of the exemplary embodiment, an upper charge generating layer 18, a charge transporting layer 19 and a lower charge generating layer 20 are stacked in this order from the upper side in FIG. 6.

The charge generating layers 18 and 20 are such layers that the layers absorb addressing light to generate photo carriers. The charge generating layer 18 controls mainly the photo carrier amount flowing from the transparent electrode 10 on the display surface side to the transparent electrode 11 on the writing surface side, and the charge generating layer 20 controls mainly the photo carrier amount flowing from the transparent electrode 11 on the writing surface side to the transparent electrode 10 on the display surface side. The charge generating layers 18 and 20 are preferably such layers that addressing light is absorbed to generate excitons, which are separated effectively into free carriers inside the charge generating layer or at the interface between the charge generating layer and the charge transporting layer.

The charge generating layers 18 and 20 can be produced by a dry method or a wet method. In the dry method, a charge generating material is directly formed into a film. Examples of the charge generating material include a metallic or non-metallic phthalocyanine, a squalirium compound, an azulenium compound, a perylene pigment, an indigo pigment, a bis- or tris-azo pigment, a quinacridone pigment, a pyrrolopyrrole colorant, a polycyclic quinone pigment, a condensed ring aromatic pigment, such as dibromoanthrone, a cyanine pigment, a xanthene pigment, a charge transfer complex of polyvinylcarbazole and nitrofluorene, and an eutectic complex of a pyrylium salt dye and a polycarbonate resin. In the wet method, a charge generating material is dispersed or dissolved in a suitable solvent along with a polymer binder to form a coating composition, and the coating composition is coated and dried to form a film. Examples of the polymer binder include a polyvinylbutyral resin, a polyarylate resin, a polyester resin, a phenol resin, a vinylcarbazole resin, a vinylformal resin, a partially modified vinylacetal resin, a carbonate resin, an acrylic resin, a vinyl chloride resin, a styrene resin, a vinyl acetate resin and a silicone resin.

The charge generating layers 18 and 20 exhibit such wavelength dispersion that the absorption coefficient thereof is high to addressing light and low to non-addressing light. The charge generating layers may be controlled to exhibit impedance symmetry to addressing light and the desired impedance asymmetry to non-addressing light by optimizing the extent of the wavelength dispersion (absorption spectrum), the concentration of the pigment and the thickness thereof.

The charge transporting layer 19 is a layer having such a function that the photo carriers generated in the charge generating layers 18 and 20 are implanted therein to drift in the direction of the electric field applied with the bias signal. In general, a charge transporting layer has a thickness of several tens times a thickness of a charge generating layer, and therefore, the capacity of the charge transporting layer 19, the dark current of the charge transporting layer 19, and the internal photo carrier current of the charge transporting layer 19 determine the contrast impedance of the entire OPC layer 15.

The charge transporting layer 19 is preferably such a property that free carriers from the charge generating layers 18 and 20 are effectively implanted therein (i.e., it preferably has an ionization potential close to that of the charge generating layers 18 and 20), and the free carriers thus implanted undergo hopping movement at a speed as high as possible. In order to increase the dark impedance, the dark current due to thermal carriers is preferably as low as possible.

The charge transporting layer 19 can be produced in the following manner. A low molecular weight positive hole transporting material or a low molecular weight electron transporting material is dispersed or dissolved in a suitable solvent along with a polymer binder to form a coating composition, or in alternative, a polymer formed of the aforementioned positive hole transporting material or electron transporting material is dispersed or dissolved in a suitable solvent to form a coating composition, and the coating composition is coated and dried to form a film. Examples of the low molecular weight positive hole transporting material include a trinitrofluorene compound, a polyvinylcarbazole compound, an oxadiazole compound, a hydrazone compound, such as a benzylamino hydrazone compound and a quinoline hydrazone compound, a stilbene compound, a triphenylamine compound, a triphenylmethane compound and a benzidine compound. Examples of the low molecular weight electron transporting compound include a quinone compound, a tetracyanoquinodimethane compound, a fluorenone compound, a xanthone compound and a benzophenone compound. Examples of the polymer binder include a polycarbonate resin, polyarylate resin, a polyester resin, a polyimide resin, a polyamide resin, a polystyrene resin and a silicon-containing crosslinked resin.

(Light Shielding Layer)

The light shielding layer 14 is such a layer that is provided for optically separating addressing light and incident light upon writing to prevent malfunction due to mutual interference from occurring, and is not an essential component. However, the light shielding layer 14 is preferably provided in order to improve the performance of the display medium 1. In view of the function of the light shielding layer 14, it is demanded to have a function of absorbing at least light in the absorption wavelength range of the charge generating layers.

The light shielding layer 14 can be produced by a dry method or a wet method. In the dry method, an inorganic pigment, an organic dye or an organic pigment is directly formed into a film on the surface of the OPC layer 15 on the side of the charge generating layer 18. Examples of the inorganic pigment include a cadmium compound, a chromium compound, a cobalt compound, a manganese compound and a carbon compound. Examples of the organic dye and the organic pigment include an azo compound, an anthraquinone compound, an indigo compound, a triphenylmethane compound, a nitro compound, a phthalocyanine compound, a perylene compound, a pyrrolopyrrole compound, a quinacridone compound, a polycyclic quinone compound, a squalirium compound, an azulenium compound, a pyrylium compound and an anthrone compound. In the wet method, an inorganic pigment, an organic dye or an organic pigment is dispersed or dissolved in a suitable solvent along with a polymer binder to form a coating composition, and the coating composition is coated and dried to form a film. Examples of the polymer binder include a polyvinyl alcohol resin and a polyacrylic resin.

(Laminate Layer)

The laminate layer 13 is provided for a function of absorbing unevenness and exerting adhesion upon adhering the functional layers provided inside the upper and lower substrate (i.e., two upper and lower substrate among the external substrate 6, the internal substrate 8 and the external substrate 7), and is not an essential component. The laminate layer 13 may be formed of a polymer material having a low glass transition point, which is a material capable of adhering the display layer 12 and the light shielding layer 14 through heat or pressure. The laminate layer 13 necessarily has transmissibility to at least incident light and addressing light.

Preferred examples of the material for forming the laminate layer 13 include an adhesive polymer material, such as a urethane resin, an epoxy resin, an acrylic resin and a silicone resin.

(Writing Apparatus)

The writing apparatus (apparatus for driving an optical address type spatial light modulation device) 2 of the exemplary embodiment is an apparatus for writing an image on the display medium 1, and contains a light irradiation part (exposure device) 23 for irradiating the display medium 1 with addressing light and a voltage applying part (electric power source) 22 applying a bias voltage to the display medium as major constitutional components, with a control circuit 21 for controlling the devices.

(Light Irradiation Part)

The light irradiation part (exposure device) 23 has a function of irradiating the display medium 1 with prescribed imagewise addressing light patterns of respective color, and is not particularly limited as far as it can radiate a desired imagewise light pattern (such as a spectrum, an intensity and a spatial frequency) on the display medium 1 (specifically, on the OPC layer).

Specific examples of the structure of the light irradiation part include:

(1-1) a uniform light source, such as light sources (such as a cold cathode tube, a xenon lamp, a halogen lamp, LED and EL) arranged in an array form, and a combination of a light source and a light guide plate;

(1-2) a combination of photochromatic devices forming optical patterns (such as LCD and a photomask);

(2) a plane emission display (such as CRT, PDP, EL, LED, FED and SED); and (3) a combination of (1-1), (1-2) or (2) with an optical device (such as a microlens array, a selfock lens array, a prism array and a viewing angle adjustment sheet).

The addressing light to be radiated is an optical signal source for selectively operating a particular light modulation layer 4 (4BG of 4R) to be operated, and in a bright state (upon radiation), the charge generating layers 18 and 20 of the photoconductive layer 15 absorb photons thus radiated to form excitons.

The addressing light to be radiated preferably has energy in the absorption wavelength range of the particular photoconductive layer 15 to be operated in an amount as large as possible, and energy in the absorption wavelength range of the other photoconductive layer 15 in an amount as small as possible. The addressing light to be radiated preferably has a peak intensity within the absorption wavelength range of the particular photoconductive layer 15 (15BG or 15R) to be operated with a band width as small as possible.

The irradiation intensity of the addressing light to be radiated is generally an optimum value determined experimentally to provide a contrast of the particular light modulation layer 15 to be operated as large as possible and malfunctions of the other light modulation layer 15 as small as possible. The irradiation intensity of the addressing light will be described in detail later.

(Voltage Application Part)

The voltage application part (electric power source) 22 has a function of applying a prescribed bias voltage to the display medium 1, and is capable of applying a desired voltage waveform to the display medium (between the electrodes) based on the input signal from the control circuit 21. The voltage application part 22 is demanded to exert AC output and show a high throughput. The voltage application part 22 may be, for example, a bipolar high voltage amplifier.

Application of voltage from the voltage application part 22 to the display medium 1 is effected through contact terminals 24BG, 24R, 25BG and 25R (herein after, simply referred to as contact terminals 24 and 25) between the transparent electrode 10 and the transparent electrode 11.

The contact terminals 24 and 25 are members for conducting between the voltage application part 22 and the display medium (transparent electrodes 10 and 11) through contact therewith, and are selected to have high conductivity and small contact resistances to the transparent electrodes 10 and 11 and the voltage application part 22. In order to enable separation between the display medium 1 and the writing apparatus 2, such a structure is preferred that the assembly can be separated from the transparent electrode 10 and 11 or the voltage application part 22, or from both of them.

Examples of the contact terminals 24 and 25 include a terminal formed of a metal (such as gold, silver, copper, aluminum andiron), carbon, a composite having a metal or carbon dispersed in a polymer or an electroconductive polymer (such as a polythiophene compound and a polyaniline compound) having a clip or connector form capable of holding the electrode.

The voltage applied between the transparent electrode 10 and the transparent electrode 11 is such a voltage that operates the light modulation layer 4 to be operated. The formation of an electric field between the transparent electrode 10 and the transparent electrode 11 provides energy for formation and movement of photo carriers in the photoconductive layer 15 and for changing the orientation of the cholesteric liquid crystal 17.

The applied voltage is such a voltage that the divided voltage to the display layer 12 exceeds the threshold voltage of a phase change from a planer phase or a focal conic phase to a homeotropic phase upon exposure of the addressing light (bright state) and is less than the threshold voltage upon non-exposure of the addressing light (dark state).

The frequency of the applied voltage is preferably such a frequency that the light-dark impedance ratio of the photoconductive layer 15 can provide the aforementioned desired change in voltage. A too high frequency causes, in some cases, decrease in bright current, which is controlled by the mobility of the charge transporting layer, and increase in dark current due to contribution of the capacitor component to electric current, so as to fail to obtain a sufficient light-dark impedance ratio.

The waveform of the application voltage is preferably such a form that at least the end of the waveform is precipitously changed to zero. In the case where the change is gradual, there are some cases where the change in orientation from the homeotropic phase state to the planer phase state in the displaying period is impaired.

(Control Circuit)

The control circuit 21 is a member having a function of controlling the operations of the voltage application part 22 and the light irradiation part 23 based on image data supplied from the outside (such as an image capturing device, an image receiving device, an image processing device, an image reproducing device and a device having plural functions among these).

(Operation)

The operation of the method for driving an optical address type spatial light modulation device according to the exemplary embodiment will be described in detail below with reference to the system shown in FIG. 6 as an example.

Figure 7:
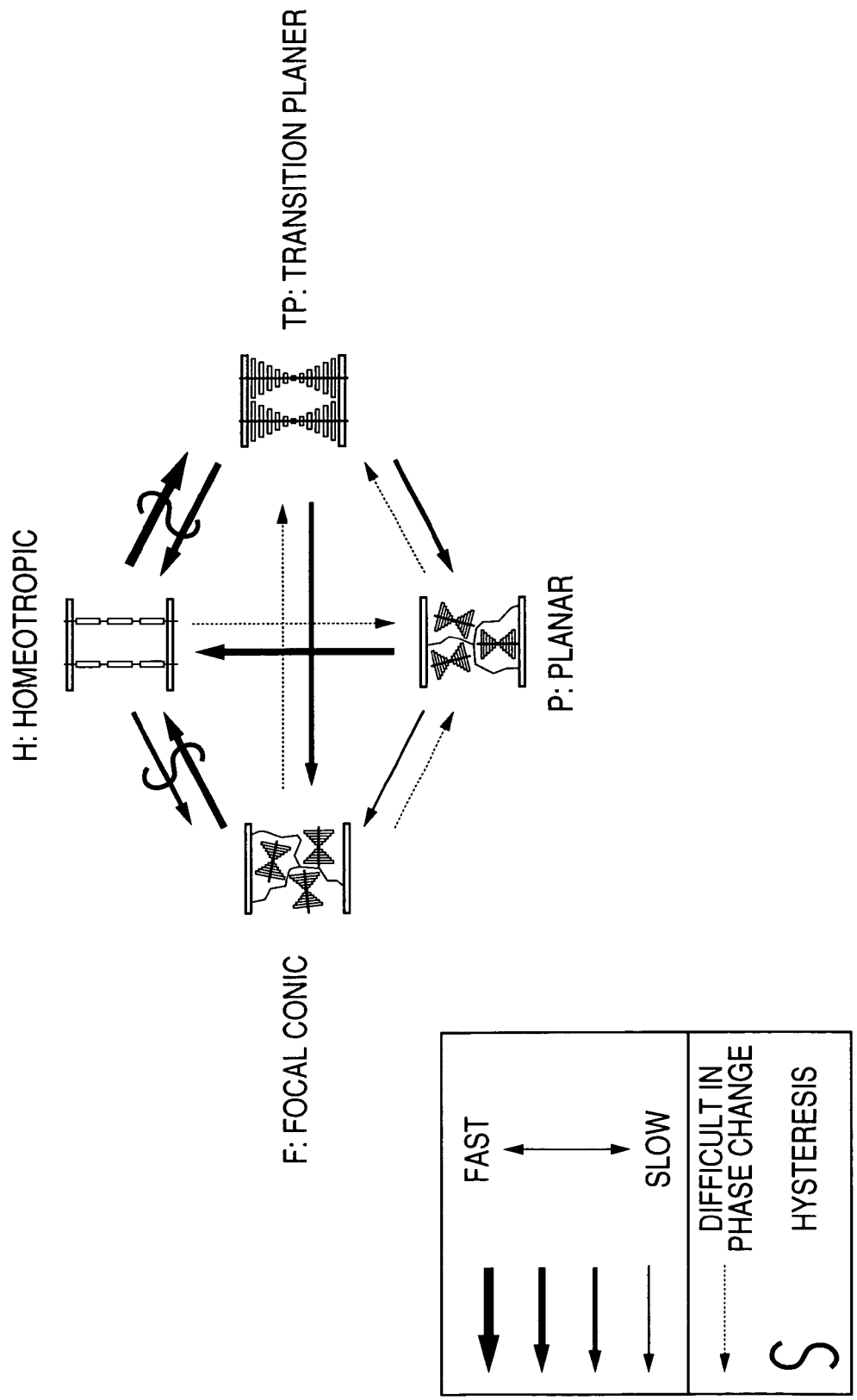
FIG. 7 is a schematic illustration showing a list of phase changes of a cholesteric liquid crystal.

FIG. 7 is a schematic illustration showing a list of phase changes of a cholesteric liquid crystal. A planer phase (P) as the initial state is changed to a focal conic phase (F) or a homeotropic phase (H) corresponding to the applied voltage, and a focal conic phase (F) as the initial state is changed to a homeotropic phase (H) corresponding to the applied voltage.

In the case where a state of a homeotropic phase (H) is maintained by applying a suitable voltage, the state is returned to a focal conic phase (F) or changed to a planer phase (P) through a transition planer phase (TP) depending on the extent and the decreasing rate of the applied voltage. In the case where the suitable voltage is applied in the state of a transition planer phase (TP), it is changed to a focal conic phase (F) and stabilized.

Figure 8:
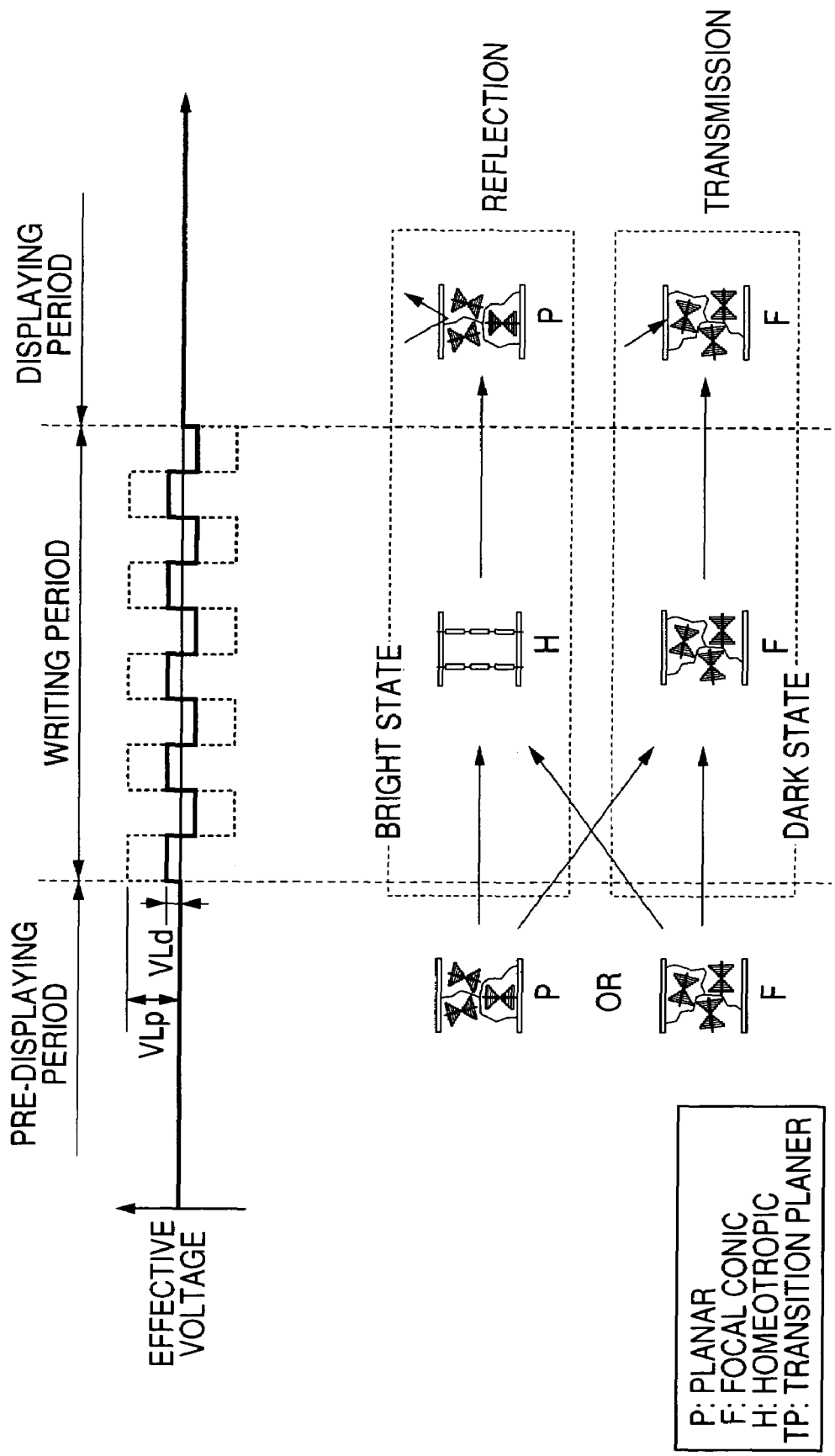
FIG. 8 is a time-series chart showing a mutual relationship between waveform of the applied voltage and an orientation state of the liquid crystal in the display layer when addressing light is irradiated to the light modulation layer.

FIG. 8 is a time-series chart showing the mutual relationship between the waveform of the applied voltage and the orientation state of the liquid crystal in the display layer 12BG in the operation on irradiation of addressing light (BG light) to the light modulation layer 4BG of the display medium 1.

In the pre-displaying period, acquirement of the control signal and the image data and exchange of data in the control circuit 21 are carried out while the display medium 1 maintains a pre-displaying (pre-writing) state. In the case where the display medium 1 has been separated from the writing apparatus 2, the display medium 1 is set at the prescribed position, and connection of the contact terminals 24BG, 25BG, 24R and 25R is made.

In the pre-displaying period, the display layer (liquid crystal layer) 12BG is stabilized in a planer phase (P) or a focal conic phase (F).

The pre-displaying period is ensured as such a period that is sufficient for completing necessary preparations for writing, such as acquirement of the control signal and the image data, exchange of data in the control circuit 21, and setting of the display medium 1.

In the writing period (writing step), an image is written in the display medium 1. Specifically, the display medium 1 is imagewise exposed from the exposure surface (on the side of the external substrate 7) while such a voltage is applied between the transparent electrodes 10BG and 11BG that the divided voltage applied to the display layer 12BG exceeds the threshold voltage of a phase change from a planer phase (P) or a focal conic phase (F) to a homeotropic phase (H) in the cholesteric liquid crystal 17 upon exposure (bright state), and exceeds the threshold voltage of a phase change from a planer phase (P) to a focal conic phase (F) but does not exceed the threshold voltage of a phase change from a planer phase (P) or a focal conic phase (F) to a homeotropic phase (H) in the cholesteric liquid crystal 17 upon non-exposure (dark state) (in the chart shown in FIG. 8, the divided voltage (effective voltage) on the display layer 12 is shown rather than the voltage applied between the transparent electrodes 11BG and 11BG).

Referring to FIG. 8, only with the effective voltage VLd to the display layer 12BG upon applying a prescribed voltage between the transparent electrodes 10BG and 11BG (dark state), the state in a focal conic phase is maintained, and the state in a planer phase is changed to a focal conic phase. Upon irradiation of addressing light, on the other hand, the resistance of the photoconductive layer 15BG is decreased to increase the divided voltage applied to the display layer 12 BG to make an effective voltage VLp. The divided voltage thus exceeds the threshold voltage of a phase change from a planer phase or a focal conic phase to a homeotropic phase in the cholesteric liquid crystal 17BG of the display layer 12BG, whereby the liquid crystal is in a homeotropic phase.

In the writing period, the state of exposure or non-exposure of addressing light is selected imagewise to write an image on the display medium. However, no reflection image is formed on the display medium 1 in this stage.

The period of time required in the writing period may be such a period that is necessary and sufficient for the phase change from a planer phase or a focal conic phase to a homeotropic phase. In an ordinary cholesteric liquid crystal, the longest period is required for the phase change from a planer phase to a focal conic phase, and thus the period of time require in the writing step is relatively long. Specifically a period of about 200 ms is required while it cannot be determined unconditionally.

In the writing period, the prescribed voltage is consistently applied between the transparent electrodes 10BG and 11BG.

The addressing light is also consistently radiated within the writing period, but may be turned on and off unless the operation is impaired.

Finally, in the displaying period, the voltage having been applied in the writing period is then removed, and radiation of addressing light is also terminated. Upon removing the applied voltage, the orientation of the cholesteric liquid crystal is changed to a memory state under no electric field, whereby an image is displayed on the display medium 1. The phase change from a homeotropic phase to a planer phase occurs in the bright part in the image of irradiation of addressing light, and a focal conic phase is maintained in the dark part therein.

The period of time required in this step may be such a period that is necessary for effecting the change in orientation. A bias signal and addressing light are not required in this step, and therefore, the display medium 1 may be separated from the writing apparatus 2.

The operation on irradiation of addressing light described herein is also effected similarly and simultaneously to the light modulation layer 4R (except that an image to be written in is generally different). However, BG light, which is addressing light to the light modulation layer 4BG, is non-addressing light to the light modulation layer 4R. Accordingly, there has been ordinarily a problem of crosstalk in the light modulation layer 4R, which is directly irradiated with the BG light from the light irradiation part (exposure device) 23, but in the exemplary embodiment, the intensity of the BG light radiated from the light irradiation part 23 is in the "particular range" having been described herein above, and therefore, the problem of crosstalk can be eliminated.

Figure 9:
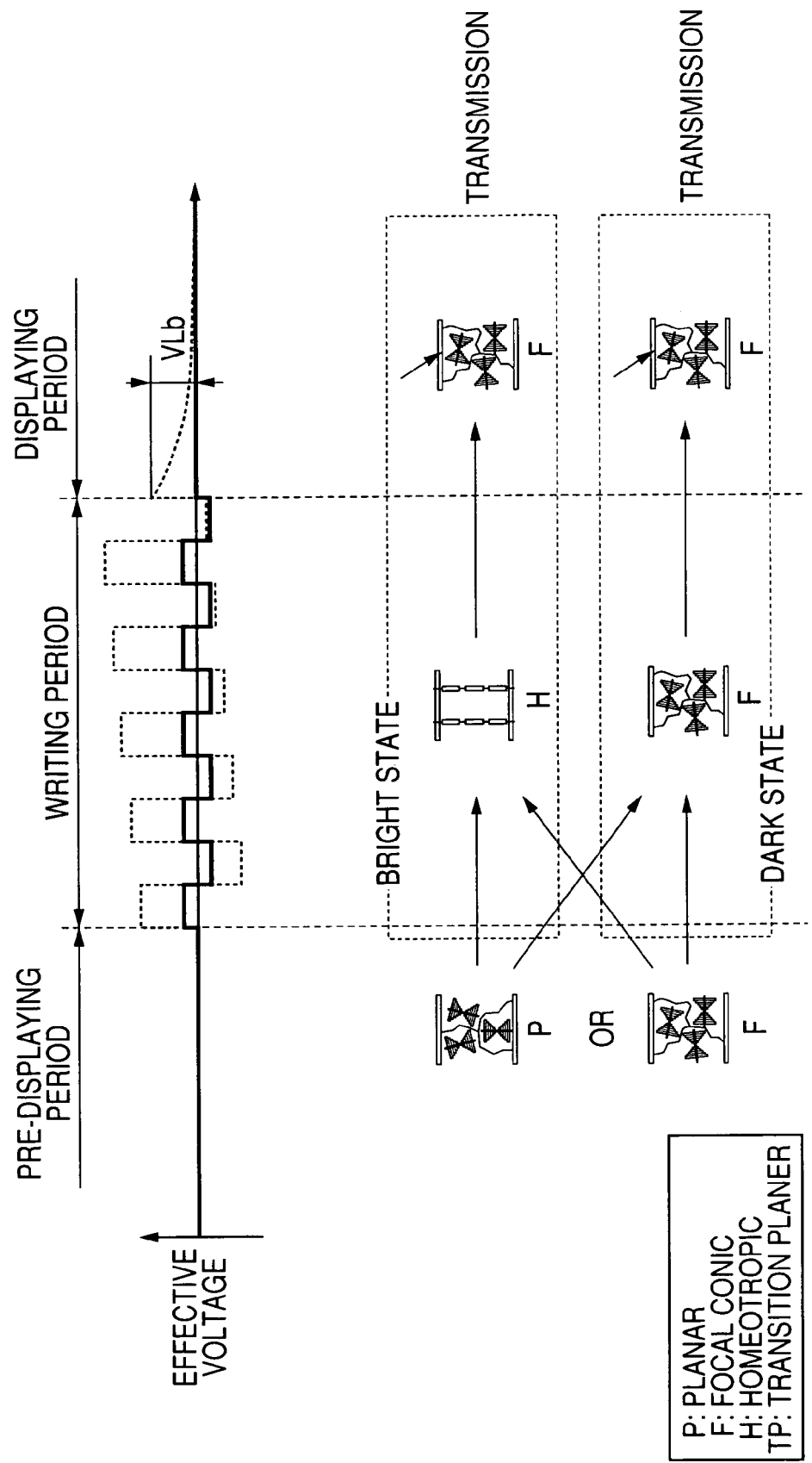
FIG. 9 is a time-series chart showing a mutual relationship between waveform of the applied voltage and the orientation state of the liquid crystal in the display layer when non-addressing light is irradiated to the light modulation layer.

FIG. 9 is a time-series chart showing the mutual relationship between the waveform of the applied voltage and the orientation state of the liquid crystal in the display layer 12R in the operation on irradiation of non-addressing light (BG light) to the light modulation layer 4R of the display medium 1. No influence of crosstalk is necessarily considered in a pixel simultaneously irradiated with addressing light (R light) (i.e., a part where the display layer 12R is originally in a reflection state), and therefore, a pixel not irradiated with addressing light (R light) is shown in this example.

The pre-displaying period is the same as that on irradiation with addressing light.

In the writing period (writing step), upon radiating BG light, which is non-addressing light, under the state where a prescribed voltage is applied, the divided voltage (effective voltage) applied to the display layer 12R is changed from the pulses shown by the solid line to the pulses shown by the broken line in FIG. 9, and in the case where the increase of voltage is large, a planer phase or a focal conic phase is changed to a homeotropic phase. In this case, the intensity of the BG light is in the "particular range", and the entire pulses are gradually biased to the pulses shown by the broken line based on the impedance asymmetry of the charge generating layers 18R and 20R of the OPC layer 15R to the BG light. At the point where application of voltage and radiation of BG light are terminated, a bias voltage of an amount VLb shown in FIG. 9 is formed.

Finally, in the displaying period, the voltage having been applied in the writing period is removed, and radiation of the BG light is also terminated. In this stage, the bias voltage VLb remains while the voltage applied to the transparent electrodes 10R and 11R is removed, and as a result, the bias voltage VLb acts on the display layer 12, whereby the homeotropic phase is changed to a focal conic phase and stabilized.

The phase changes upon irradiation with BG light, which is non-addressing light, i.e., so-called bright state, has only been described. In the case where BG light, which is non-addressing light, is not radiated, i.e., so-called dark state, the same situation occurs in the dark state of the addressing light in FIG. 8, all the states including a planer phase are uniformed to be a focal conic phase, which is maintained until the displaying period.

According to the aforementioned mechanisms, the liquid crystal is finally uniformed to a focal conic phase to the BG light, which is non-addressing light, in both bright and dark states, whereby the problem of crosstalk is resolved in total.

In the case where the exposure surface of the display medium 1 (i.e., on the side of the external substrate 7) is irradiated imagewise with BG light and R light from the light irradiation part (exposure device) 23 under the conditions where the aforementioned operations can be effected, the BG light is transmitted through the light modulation layer 4R and absorbed by the OPC layer 15BG of the light modulation layer 4BG to operate the display layer 12BG. Upon transmitting through the light modulation layer 4R, the BG light has an intensity within the "particular range", and thus the problem of crosstalk is eliminated or reduced to provide no influence on coloration of the light modulation layer 4R. The BG light remaining unabsorbed is absorbed by the light shielding layer 14BG.

On the other hand, the R light is absorbed by the OPC layer 15R of the light modulation layer 4R to operate the display layer 12R. The BG light remaining unabsorbed is absorbed by the light shielding layer 14R and does not proceed into the upper layer. Therefore, the R light does not reach the light modulation layer 4BG to cause in principle no problem of crosstalk.

As having been described, according to the exemplary embodiment, the intensity of the BG light for exposure in the writing step of the light modulation layer 4BG positioned on the side of the display surface is in the "particular range" of the light modulation layer 4R positioned on the side of the exposure surface with respect to the light modulation layer 4BG, whereby the problem of crosstalk in the OPC layer 15R of the light modulation layer 4R is eliminated. Accordingly, a favorable color image having high color reproducibility without color mixing can be formed.

In the exemplary embodiment, the intensity of the R light may be arbitrary determined since the light shielding layer 14R is provided in the light modulation layer 4R. In the case where the light shielding layer is not provided, it is preferred that the intensity of the R light for exposure in the writing step of the light modulation layer 4R is in the "particular range" of the light modulation layer 4BG to eliminate the problem of crosstalk in the OPC layer 15BG of the light modulation layer 4BG.

While the exemplary embodiments have been described in detail with reference to the preferred embodiment, the invention is not construed as being limited to the exemplary embodiments. For example, while the exemplary embodiment refers to the constitution having an optical address type light modulation layer (light modulation layer) having the two-layer structure, the selective reflection layer in the invention is not limited to a two-layer structure but may include structures containing three or more layers. In the case where the invention is applied to a three-layer structure, in which blue, green and red colors are designated to the layers, respectively, to form a full color image by additive color mixing, such an image can be obtained that has good image quality having high color reproducibility without color mixing.

In the case where the optical address type light modulation layer has a structure containing three or more layers, there is no particular limitation in determining the combination of the "particular range" of the photoconductive layer of the optical address type light modulation layer, and the intensity of addressing light of the optical address type light modulation layer to be set in the "particular range", and when the intensity of addressing light is in the "particular range" in at least one combination, crosstalk is eliminated, in the relationship between the addressing light and the optical address type light modulation layer of the combination.

In order to eliminate the problem of crosstalk in all the optical address type light modulation layers with respect to all kinds of the addressing light, the intensity of the addressing light is in the "particular range" in all the combinations when no light shielding layer is contained in the optical address type light modulation layers. In the case where the optical address type light modulation layers contain the light shielding layers, however, it is sufficient that the intensities of light (addressing light) for exposure in the writing steps of all the optical address type light modulation layers other than the optical address type light modulation layer positioned closest to the exposure surface are in the "particular ranges" of all the optical address type light modulation layers positioned on the side of the exposure surface with respect to the optical address type light modulation layer, respectively.

In the case where the optical address type light modulation layer has a structure containing three or more layers, it is preferred to form the photoconductive layers thereof under such control that two or more of the other optical address type light modulation layers than the optical address type light modulation layer subjected to the writing step have the "particular ranges" that overlap each other. This is because if the "particular ranges" do not overlap each other, the intensity of light for exposure in the writing step cannot be in the "particular ranges" of the plural layers. The method for controlling the particular range by the photoconductive layer in the optical address type light modulation layer and the frequency of the addressing light will be described later.

(Control of Particular Range)

As having been described, the "particular range" is defined as such a range where the final light reflectivity of at least one of the other optical address type light modulation layers than the optical address type light modulation layer subjected to irradiation with addressing light, the final light reflectivity, which is gradually increased with respect to increase of the light intensity, is firstly decreased. The definition includes not only a region, which appears after the light reflectivity has a local maximum value and has an evident bottom in light reflectivity, such as the region (2) in FIG. 5 (that is, a range where the intensity of the exposure light is larger than an intensity, which the dotted curve shown in FIG. 5 has at the local maximum point, and the final light reflectivity is smaller than a light reflectivity, which the dotted curve has at the local maximum point), but also a region having such a curve that has a point (inflection point) where gradual increase is once attenuated without an evident bottom. It is preferred to use an optical address type light modulation device having the particular ranges having been controlled in such a manner that the photoconductive layers in the optical address type light modulation layers are controlled to provide the former region (i.e., the minimum value in light reflectivity or a vicinity thereof).

The light reflectivity in the particular range is close to zero as much as possible, and the region (2) in FIG. 5 shows a substantially ideal light reflectivity of the particular range since the light reflectivity is zero at the bottom.

Figure 10:
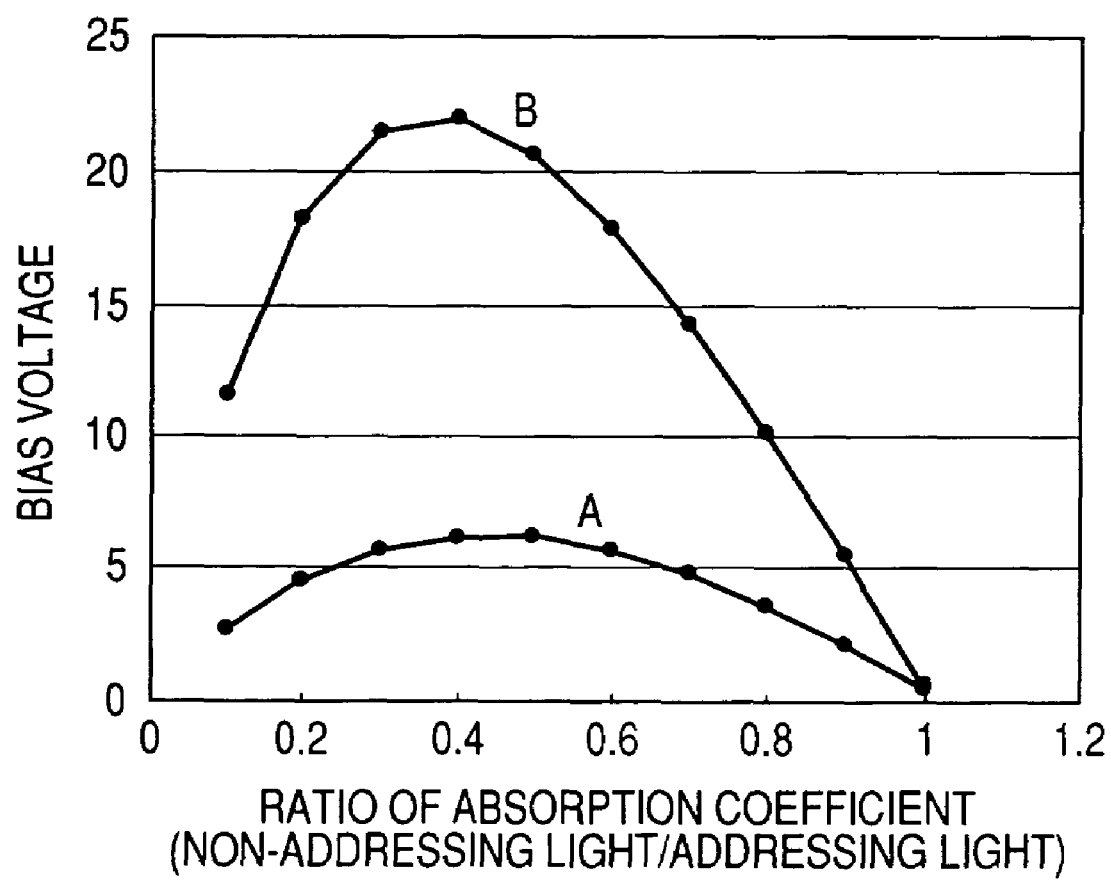
FIG. 10 is a graph showing change in bias voltage upon completing the writing step in the case where absorption coefficients of a pair of charge generating layers A and B of an example photoconductive layer with respect to non-addressing light and addressing light.

In order to control the "particular range" of the optical address type light modulation layer upon irradiation with non-addressing light, the spatial stacked charge amount generated by the difference in photo carrier generation amount between the upper and lower charge generating layers is controlled, and the bias voltage upon completing the writing step is controlled. FIG. 10 is a graph showing an example of influence of an absorption spectrum of a photoconductive layer on a bias voltage.

Specifically, the graph in FIG. 10 shows change in bias voltage upon completing the writing step with respect to the absorption coefficients of an example photoconductive layer to non-addressing light and addressing light. In FIG. 10, the abscissa shows a ratio of absorption coefficient to non-addressing light and addressing light in terms of non-addressing light/addressing light, and the ordinate shows the bias voltage upon completing the writing step. The graph A is the case where the light absorption amount of the entire charge generating layer is small, and the graph B is the case where the light absorption amount of the entire charge generating layer is large.

By controlling the difference in absorption coefficient of the photoconductive layer to non-addressing light and addressing light in this manner, the difference in photo carrier generation amount between the upper and lower charge generation layers can be controlled, whereby the bias voltage influencing the behavior of the "particular range" can be controlled.

In particular, there is such a tendency that the bias voltage exhibit a maximum value in a range where the absorption coefficient ratio (non-addressing light/addressing light) is from 0.2 to 0.6, in which the bottom in reflectivity in the particular range can be enhanced to make it close to zero as much as possible.

In practice, the difference in absorption coefficient of the photoconductive layer to non-addressing light and addressing light can be controlled by appropriately selecting the chemical structure and the crystalline structure of the charge generating material to design the absorption spectrum, and the shape of the particular range on the graph can be controlled.

The difference in absorption coefficient of the photoconductive layer to non-addressing light and addressing light can also be controlled by designing the emission spectrum of the addressing light, and the shape of the particular range on the graph can be controlled.

In the case where the optical address type light modulation layer has a structure containing three or more layers, it is preferred to control the positions of the optical address type light modulation layers (or the light intensities) in such a manner that two or more of the other optical address type light modulation layers than the optical address type light modulation layer subjected to exposure in the writing step have the "particular ranges" that overlap each other depending on necessity.

As shown in FIG. 10, the bias voltage is changed by controlling the light absorption amount of the entire charge generating layer. Therefore, the relationship between the light intensity providing change in reflectivity to the addressing light and the light intensity providing the particular range to the non-addressing light can be arbitrarily set by designing the difference in absorption coefficient to non-addressing light and addressing light shown by the abscissa and the light absorption amount of the entire charge generating layer are designed, and thus in the case where the optical address type light modulation layer has a structure containing three or more layers, the positions of the optical address type light modulation layers (or the light intensities) can be controlled to make the "particular ranges" thereof overlap each other.

The light absorption amount of the entire charge generating layer can be controlled by appropriately designing the absorption coefficient and the concentration in the film of the charge generating material, and the thickness of the charge generating layer.

EXAMPLE

The exemplary embodiments will be further described in more detail with reference to the following exemplary examples, but the invention is not construed as being limited to the exemplary examples.

The devices shown in FIG. 6 are produced as a system containing an optical address type spatial light modulation device (display medium) and a writing apparatus to be subjected to examples of the invention and comparative examples, and writing operation according to Example 1 and Comparative Examples 1 and 2 are carried out. The display medium thus produced has a light modulation layer having a two-layer structure 4BG and 4R. The details thereof will be described with reference to FIG. 6.

(Production of OPC Layer 15R)

A polyethylene terephthalate (PET) film having a thickness of 125 μm with ITO (surface resistance: 300Ω per square) formed on one surface thereof (Highbeam, produced by Toray Industries, Ltd.) is cut into a 50.8 mm (2 inch) square to obtain an external substrate 7 and a transparent electrode 11R.

A charge generating material (a titanium phthalocyanine pigment) is dispersed in a solution, which has been obtained by dissolving a polyvinyl butyral resin in butanol, in a paint shaker to prepare a coating composition, and the coating composition is coated by a spin coating method on the surface having ITO (transparent electrode 11R) of the external substrate 7, followed by drying, to form a charge generating layer 20R having a dry thickness of 0.2 μm.

A polycarbonate resin and a charge transporting material (benzidine-N,N'-bis(3-methylphenyl)-1,1'-biphenyl-4,4'-diamine) are dissolved in monochlorobenzene to prepare a coating composition, and the coating composition is coated by a gap coating method on the charge generating layer 20R, followed by drying, to form a charge transporting layer 19R having a dry thickness of 6 μm. A charge generating material (a titanium phthalocyanine pigment) is dispersed in a solution, which has been obtained by dissolving a polyvinylbutyral resin in butanol, in a paint shaker to prepare a coating composition, and the coating composition is coated by a spin coating method on the charge transporting layer 19R, followed by drying, to form a charge generating layer 18R having a dry thickness of 0.35 μm. Thus, an OPC layer 15R having the charge generating layer 20R, the charge transporting layer 19R and the charge generating layer 18R is formed.

A polyethylene terephthalate (PET) film having a thickness of 50 μm with ITO (surface resistance: 300Ω per square) formed on both surfaces thereof is cut into a 50.8 mm (2 inch) square to obtain a transparent electrode 10R, an internal substrate 8 and a transparent electrode 11BG as a constitutional component of a light modulation layer 4BG.

A charge generating material (a diboromoanthrone pigment) is dispersed in a solution, which has been obtained by dissolving a polyvinyl butyral resin in butanol, in a paint shaker to prepare a coating composition, and the coating composition is coated by a spin coating method on the surface having ITO to be the transparent electrode 11BG, followed by drying, to form a charge generating layer 20BG having a dry thickness of 0.2 μm. A polycarbonate resin and a charge transporting material (benzidine-N,N'-bis(3-methylphenyl)-1,1'-biphenyl-4,4'-dia mine) are dissolved in monochlorobenzene to prepare a coating composition, and the coating composition is coated by a gap coating method on the charge generating layer 20BG, followed by drying, to form a charge transporting layer 19BG having a dry thickness of 6 µm. A charge generating material (a diboromoanthrone pigment) is dispersed in a solution, which has been obtained by dissolving a polyvinyl butyral resin in butanol, in a paint shaker to prepare a coating composition, and the coating composition is coated by a spin coating method on the charge transporting layer 19BG, followed by drying, to form a charge generating layer 18BG having a dry thickness of 0.32 µm. Thus, an OPC layer 15BG having the charge generating layer 20BG, the charge transporting layer 19BG and the charge generating layer 18BG is formed.

As a cholesteric liquid crystal, 80.5% by mass of a nematic liquid crystal (E7, produced by Merck & Co., Inc.), 15.6% by mass of a dextrochiral agent (CB15, produced by Merck & Co., Inc.) and 3.9% by mass of a dextrochiral agent (R1011, produced by Merck & Co., Inc.) are mixed to prepare a material reflecting red light.

The cholesteric liquid crystal is emulsified in a 0.25% by mass sodium dodecylbenzenesulfonate aqueous solution by using a membrane emulsifying apparatus having a ceramic porous membrane having a pore diameter of 4.2 µm (Microkit, produced by SPG Technology Co., Ltd.) under a nitrogen pressure of 11.8 kPa (0.12 kgf/cm$^2$). The resulting emulsion has an average particle diameter of the cholesteric liquid crystal droplets of 14.9 µm in a substantially monodisperse state.

The emulsion is then allowed to stand to precipitate the cholesteric liquid crystal droplets, and the supernatant is removed to obtain a concentrated emulsion. 4 parts by mass of a 7.7% by mass aqueous solution of acid process bone gelatin (jelly strength: 314, produced by Nippi, Inc.) is added to 1 part by mass of the concentrated emulsion to obtain a coating composition for a display layer having a volume fraction of nonvolatile components in the coating composition of about 0.15 and a volume fraction of the cholesteric liquid crystal in the nonvolatile components of about 0.70.

The coating composition for a display layer having been heated to 50° C. to make the gelatin in a sol state is coated on one surface (to be the side of the transparent electrode 10R) of the PET film with ITO transparent electrodes on both surfaces thereof (Highbeam, produced by Toray Industries, Ltd.) having the OPC layer 15BG formed thereon by using an applicator having a micrometer with a gap having been adjusted to provide a wet thickness of 90 µm.

The coated assembly is maintained in a high temperature and high humidity chamber at 50° C. and 90% RH for 15 minutes, and then dried at room temperature for 12 hours, so as to form a PDLC layer having a thickness of about 12 µm, in which monodisperse cholesteric liquid crystal droplets having a diameter of 15 µm in a slightly planular shape dispersed densely to form a single layer in the polymer binder.

A polyvinyl alcohol aqueous solution having a copper phthalocyanine pigment dispersed therein is coated by a spin coating method on the OPC layer 15R, followed by drying, to form a light shielding layer 14R having a dry thickness of 1.2 µm. As an upper layer of the light shielding layer 14R, a two-component urethane laminating agent (A-315/A50, produced by Mitsui Takeda Chemicals, Inc.) diluted with butyl acetate is coated by a spin coating method, followed by drying, to form a laminate layer 13R having a dry thickness of 1.2 µm.

The two substrates thus produced (i.e., the external substrate 7 having the OPC layer 15R, the light shielding layer 14R and the laminate layer 13R stacked thereon, and the internal substrate 8 having the OPC layer 15BG and the display layer 12R formed on both surface thereof) are superimposed on each other in such a manner that the display layer 12R and the laminate layer 13R face each other, and the end surfaces of the two substrates are slightly deviated, and the assembly is passed through a laminator at 100° C. for adhesion to obtain a light modulation layer 4R.

The functional layers on the deviated end surface are removed to expose the ITO electrodes, whereby the transparent electrodes 10R and 11R can effect conduction from an exterior of the display medium 1.

(Production of Display Layer 14BG)

A polyethylene terephthalate (PET) film having a thickness of 125 µm with ITO (surface resistance: 300Ω per square) formed on one surface thereof (Highbeam, produced by Toray Industries, Ltd.) is cut into a 50.8 mm (2 inch) square to obtain an external substrate 6 and a transparent electrode 10BG.

As a cholesteric liquid crystal, 77.5% by mass of a nematic liquid crystal (E7, produced by Merck & Co., Inc.), 18.0% by mass of a dextrochiral agent (CB15, produced by Merck & Co., Inc.) and 4.5% by mass of a dextrochiral agent (R1011, produced by Merck & Co., Inc.) are mixed to prepare a material reflecting green light.

The cholesteric liquid crystal is emulsified in a 0.25% by mass sodium dodecylbenzenesulfonate aqueous solution by using a membrane emulsifying apparatus having a ceramic porous membrane having a pore diameter of 4.2 µm (Microkit, produced by SPG Technology Co., Ltd.) under a nitrogen pressure of 11.8 kPa (0.12 kgf/cm$^2$). The resulting emulsion has an average particle diameter of the cholesteric liquid crystal droplets of 15.0 µm in a substantially monodisperse state.

The resulting emulsion is then allowed to stand to precipitate the cholesteric liquid crystal droplets, and the supernatant is removed to obtain a concentrated emulsion. 4 parts by mass of a 7.7% by mass aqueous solution of acid process bone gelatin (jelly strength: 314, produced by Nippi, Inc.) is added to 1 part by mass of the concentrated emulsion to obtain a coating composition for a display layer having a volume fraction of nonvolatile components in the coating composition of about 0.15 and a volume fraction of the cholesteric liquid crystal in the nonvolatile components of about 0.70.

The coating composition for a display layer having been heated to 50° C. to make the gelatin in a sol state is coated on the surface having ITO (transparent electrode 10BG) of the PET film with ITO transparent electrode on one surface thereof to be the external substrate 6 by using an applicator having a micrometer with a gap having been adjusted to provide a wet thickness of 90 µm.

The coated assembly is maintained in a high temperature and high humidity chamber at 50° C. and 90% RH for 15 minutes, and then dried at room temperature for 12 hours, so as to form a PDLC layer having a thickness of about 12 µm, in which monodisperse cholesteric liquid crystal droplets having a diameter of 15 µm in a slightly planular shape dispersed densely to form a single layer in the polymer binder.

(Production of Light Modulation Layer 4BG)

A polyvinyl alcohol aqueous solution having a pyrrolopyrrole pigment dispersed therein is coated by a spin coating method on the OPC layer 15BG, followed by drying, to form a light shielding layer 14BG having a dry thickness of 1.2 µm. As an upper layer of the light shielding layer 14BG, a two-component urethane laminating agent (A-315/A50, produced by Mitsui Takeda Chemicals, Inc.) diluted with butyl acetate is coated by a spin coating method, followed by drying, to form a laminate layer 13R having a dry thickness of 1.2 μm.

The two substrates thus produced (i.e., the external substrate 7 having the light modulation layer 4R, the OPC layer 15BG, the light shielding layer 14BG and the laminate layer 13BG stacked thereon through the internal substrate 8, and the external substrate 6 having the display layer 12BG formed thereon) are superimposed on each other in such a manner that the display layer 12BG and the laminate layer 13BG face each other, and the end surfaces of the two substrates are slightly deviated, and the assembly is passed through a laminator at 100° C. for adhesion to obtain a the display medium 1. The end surface is processed in the same manner as in the production of the light modulation layer 4R.

Commercially available rubber covered clips (contact terminals 24R and 25R and contact terminals 24G and 25G) attached with lead wires are connected to the transparent electrodes 10R and 11R and the transparent electrodes 10BG and 11BG of the resulting display medium 1, respectively, and the other ends of the lead wires are connected to a high speed and high pressure amplifier (Model HEOPT1B-60, produced by Matsusada Precision Inc.) as the voltage applying part 22. A rectangular wave bias voltage having a frequency of 50 Hz is applied by using the high speed and high pressure amplifier as described later.

A light emitting diode light source (Model HLV-3M-RGB, produced by CCS Inc.) is used as the light source, which is constituted to make the light source capable of radiating on the surface of the display medium 1 on the side of the external substrate 7, and thus a light irradiating part 23 is produced. The light irradiating part 23 can radiate red light having a peak wavelength of 625 nm and a band half value width of 20 nm and blue light having a peak wavelength of 470 nm and a band half value width of 25 nm.

A multi-channel analog electric power output board (Model 6713, produced by National Instruments Corp.) and a control software (LabVIEW, produced by National Instruments Corp.) are used as the controlling circuit 21, which is wired to configure in such a manner that the operations of the voltage applying part 22 and the light irradiating part 23 can be appropriately controlled based on image data supplied from a personal computer.

While not shown in the figure, an integrating sphere spectrometer (Model CM2002, produced by Konica Minolta Holdings, Inc.) for measuring a light reflectivity of an image displayed on the display layer 12 is mounted on the display surface (on the side of the external substrate 6).

According to the aforementioned procedures, the display medium (optical address type light modulation device) 1 and the writing apparatus 2 having the display medium 1 set therein, which is to be subjected to Example 1 and Comparative Examples 1 and 2, is obtained.

Example 1 and Comparative Examples 1 and 2

Figure 11:
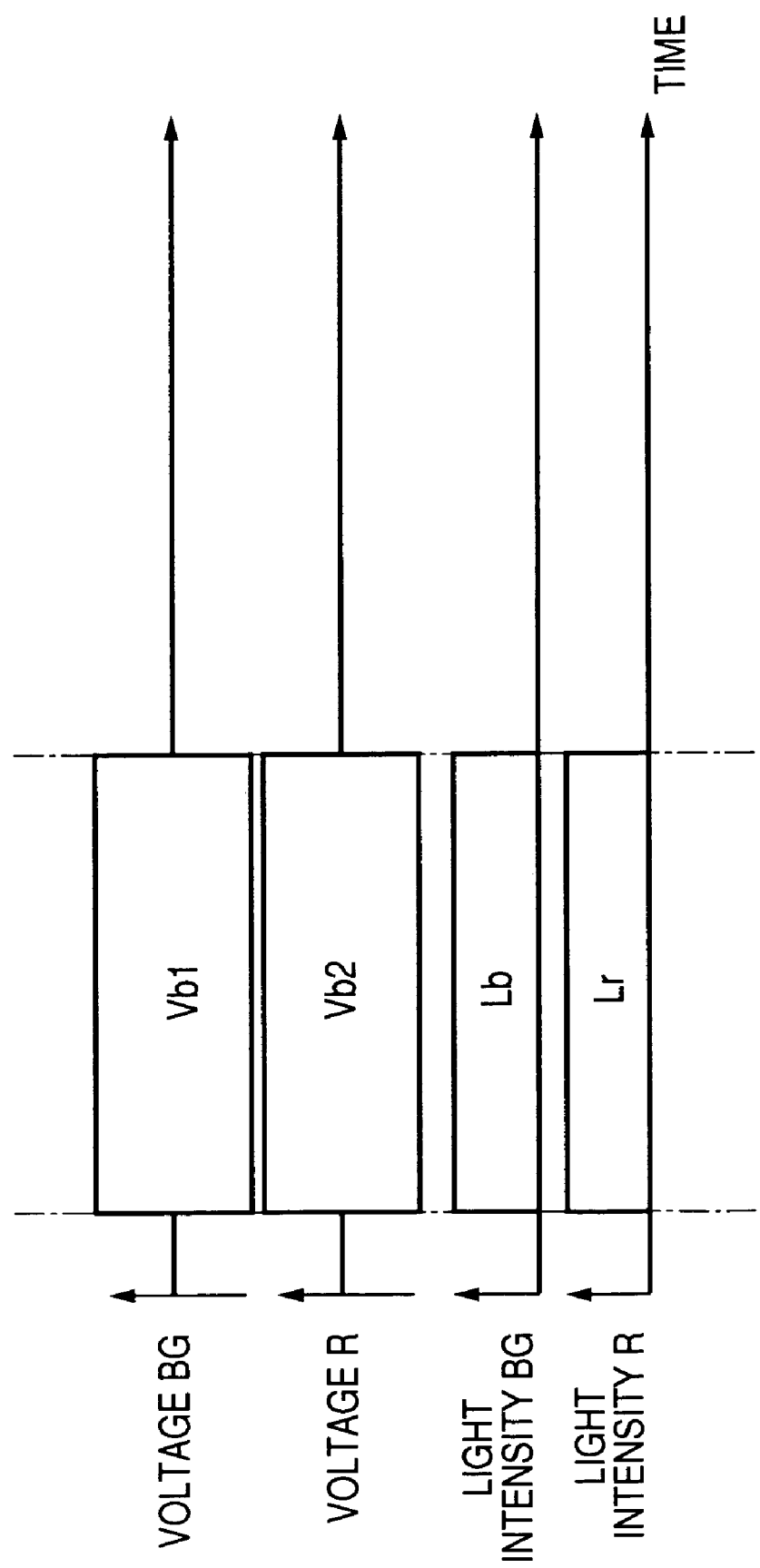
FIG. 11 is a time-series chart showing application of voltage and irradiation of addressing light in Example 1 and Comparative Examples 1 and 2.

In Example 1, application of voltage and radiation of addressing light are carried out according to the time-series chart shown in FIG. 11 with the voltage applying part 22 and the light irradiating part 23 based on the driving method according to the exemplary embodiment. In Comparative Examples 1 and 2, the application of voltage and radiation of addressing light are carried out in the same manner for comparison. Only BG light is radiated as the addressing light.

FIG. 11 is a time-series chart showing application of voltage and radiation of addressing light in Example 1 and Comparative Examples 1 and 2. The abscissa shows time, and the ordinate shows the voltage or the light intensity. The charts are, from the top to the bottom, a voltage BG applied between the transparent electrodes 24BG and 25BG, a voltage R applied between the transparent electrodes 24R and 25R, and a light intensity BG of addressing light of blue color and a light intensity R of addressing light of red color, which are radiated from the side of exposure surface (the side of the external substrate 7).

The frequency, the voltage and the application time of the voltages, and the wavelength, the intensity and the radiation time of the addressing light are summarized in Table 1 below.

TABLE 1

| | | Application voltage | | | Addressing light | | | |
| --- | --- | --- | --- | --- | --- | --- | --- | --- |
| | | Frequency (Hz) | Voltage (V) | Time (ms) | Wavelength (nm) | Intensity (mW/cm$^2$) | Time (ms) | Note |
| Example 1 | Vb1 | 50 | 260 | 200 | Lb 470 | 1.5 | 200 | conditions according to the |
| | Vr1 | 50 | 150 | 200 | Lr 625 | 0 | 200 | exemplary embodiment (written in within the particular range) |
| Comparative Example 1 | Vb1 | 50 | 260 | 200 | Lb 470 | 0.5 | 200 | written with light intensity smaller than the particular range |
| | Vr1 | 50 | 150 | 200 | Lr 625 | 0 | 200 | |
| Comparative Example 2 | Vb1 | 50 | 260 | 200 | Lb 470 | 3 | 200 | written with light intensity larger than the particular range |
| | Vr1 | 50 | 150 | 200 | Lr 625 | 0 | 200 | |

(Evaluation)

Figure 12:
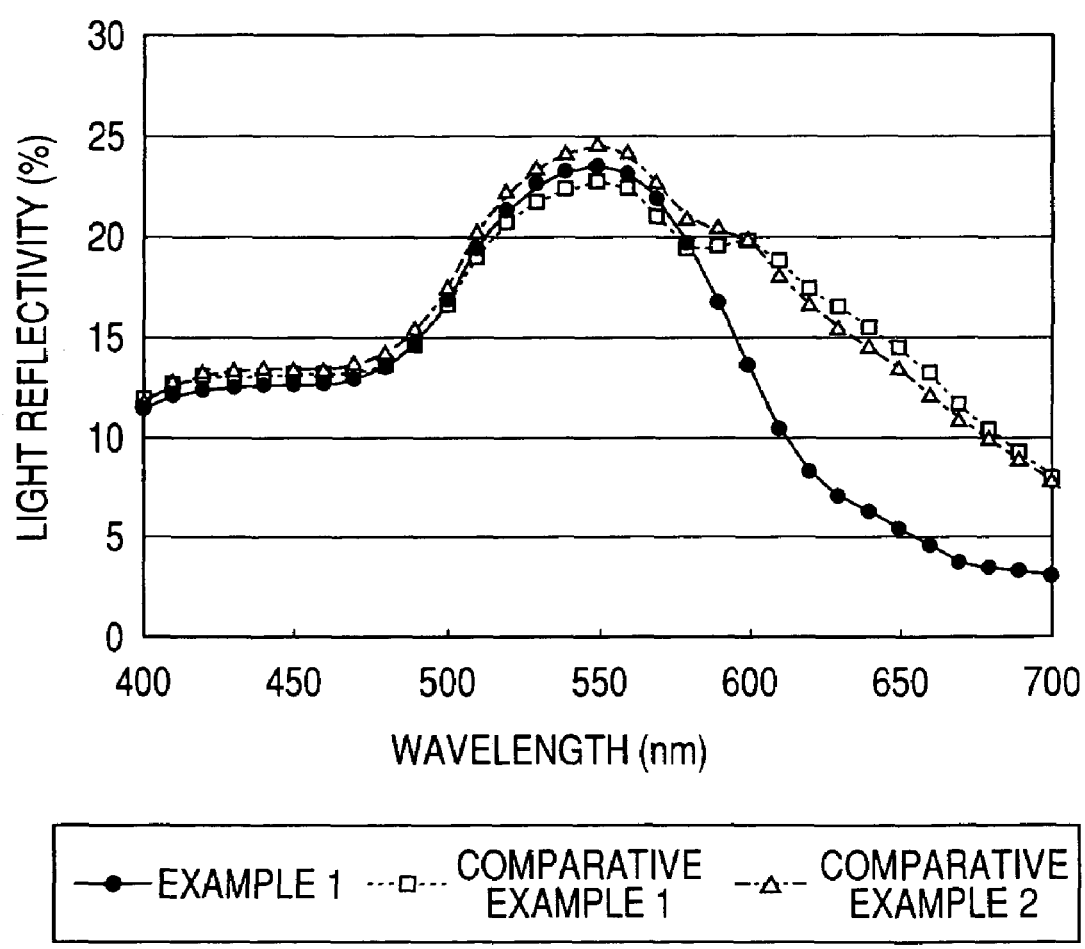
FIG. 12 is a graph showing the results in Examples 1 and Comparative Examples 1 and 2, in which the results are plotted for each of Example and Comparative Examples with abscissa indicating the wavelength of reflected light and ordinate indicating the measurement results of light reflectivity.

The resulting displayed image of BG color is measured for reflection spectrum by the integrating sphere spectrometer. The light reflectivity of the displayed image is measured in such a manner that after completing the writing period, the applied bias voltage is terminated (displaying period), and after several seconds, the light reflectivity on the display surface of the display medium 1 (on the side of the external substrate 6) is measured. The results obtained are shown in FIG. 12.

In all the displayed images, graphs having a peak center around 550 nm are obtained, but in Comparative Examples 1 and 2, the graphs are broadened on the long wavelength side, and thus it is understood that R color with a long wavelength is erroneously formed due to crosstalk upon passing the BG light through the light modulation layer 4R.

Figure 13:
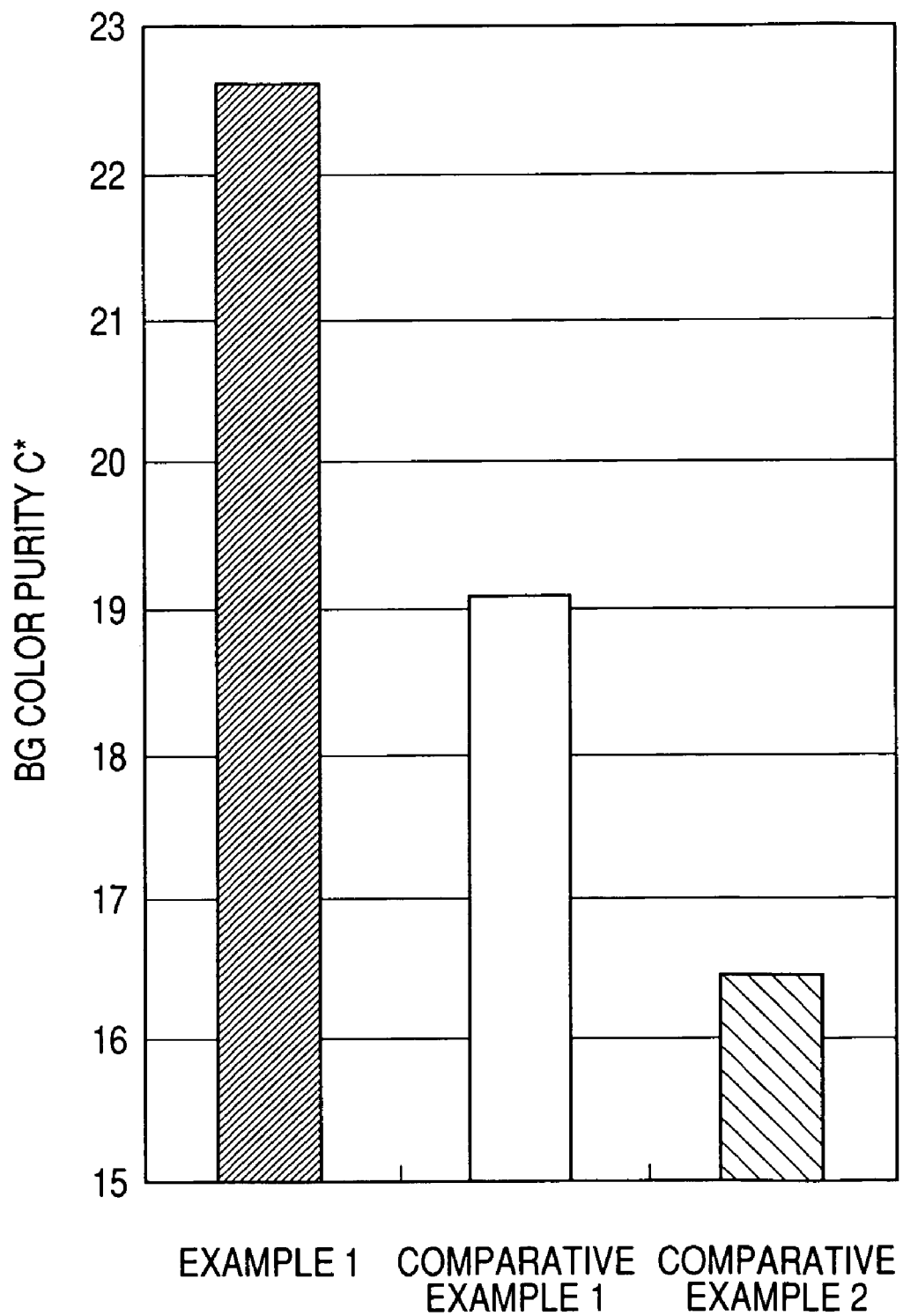
FIG. 13 is a chart showing the results of light purity C* of BG color in Examples 1 and Comparative Examples 1 and 2.

In order to confirm reproducibility of BG color, the light purity C* of BG color is obtained from the measurement results of the aforementioned reflection spectra. The results are shown by the bar chart shown in FIG. 13. It is understood from the chart in FIG. 13 that BG color with considerably high purity can be reproduced in Example 1.

In Comparative Examples 1 and 2, on the other hand, color mixing is observed due to influence of crosstalk, and thus it is understood that the light purity C* of BG color is considerably inferior, and the color reproducibility is insufficient.

The light purity C* of BG color referred herein is a value obtained as a distance between the origin and the chromatic coordinate a* and b* in the L*a*b* (CIE1976) space.

What is claimed is:

1. A method for driving an optical address type spatial light modulation device to record an image onto the optical address type spatial light modulation device comprising:
    a first light modulation layer; and
    a second light modulation layer, the first and second first light modulation layers stacked on each other, each of the first and second light modulation layers comprising:
        a display layer that reflects a predetermined color upon applied a predetermined threshold voltage or more thereto;
        a photoconductive layer that has an optical switching function of absorbing light in a specified wavelength range to change electric characteristics in accordance with an amount of light absorbed, the display layer and the photoconductive layer being stacked on each other; and
        electrodes on an outer side of the display layer and on an outer side of the photoconductive layer, respectively,
    each photoconductive layer comprising:
        a pair of charge generating layers; and
        a charge transporting layer disposed between the charge generating layers,
    wherein the photoconductive layers of the first and second light modulation layers are different in the specified wavelength range from the photoconductive layer of the third light modulation layers,
the method further comprising:
    exposing the optical address type spatial light modulation device to first imagewise light having a wavelength in the specified wavelength range of the first light modulation layer; and
    applying such a first voltage between the electrodes of the first light modulation layer that a voltage applied to the display layer of the first light modulation layer exceeds a first threshold value, which is the predetermined threshold value of the first light modulation layer upon exposure, and does not exceeds the first threshold value upon non-exposure;
    applying a second voltage between the electrodes of the second light modulation layer, wherein:
    the exposing and the first and second voltage applying are done at the same time, and
    if the second light modulation layer has such a characteristic that a first curve of an intensity of light, which has the same wavelength as the first imagewise light and is applied to the second light modulation layer, versus a reflectivity of the second light modulation layer after finishing applying the light has a first local maximum point,
        (a) an intensity of the first imagewise light in the exposing is larger than an intensity, which the first curve has at the first local maximum point, and
        (b) in the exposing, the second light modulation layer has a reflectivity lower than a reflectivity, which the first curve has at the first local maximum point.

2. The method according to claim 1, wherein in the exposing of the optical address type spatial light modulation device to the first imagewise light while applying the first voltage, the optical address type spatial light modulation device is irradiated with the first imagewise light from a second-light-modulation-layer side.

3. The method according to claim 1, wherein:
    the first curve has a local minimum point, and
    the intensity of the first imagewise light in the exposing is around an intensity, which the first curve has at the local minimum point.

4. The method according to claim 1, wherein:
    the display layer of each of the first and second light modulation layers comprises a liquid crystal layer, which reflects light in the corresponding specified wavelength range, the liquid crystal layer comprising a cholesteric liquid crystal,
    the specified wavelength ranges of the first light modulation layer is different from that of the second light modulation layer, each liquid crystal layer transmitting light outside the corresponding specified wavelength range, and
    the charge generating layers of each of the first and second light modulation layers exhibit impedance symmetry when the corresponding photoconductive layer is irradiated with light having a wavelength in the corresponding specified wavelength range from a predetermined one surface of the optical address type spatial light modulation device.

5. The method according to claim 1, further comprising:
    exposing the optical address type spatial light modulation device to second imagewise light having a wavelength in the specified wavelength of the second light modulation layer, wherein:
    the applying of the second voltage applies such the second voltage between the electrodes of the second light modulation layer that a voltage applied to the display layer of the second light modulation layer exceeds a second threshold value, which is the predetermined threshold value of the second light modulation layer upon exposure, and does not exceed the second threshold value upon non-exposure.

6. The method according to claim 5, wherein:
    if the first light modulation layer has such a characteristic that a second curve of an intensity of light, which has the same wavelength as the second imagewise light and is applied to the first light modulation layer, versus a reflectivity of the first light modulation layer after finishing applying the light has a second local maximum point,
        (c) an intensity of the second imagewise light in the exposing is larger than an intensity, which the second curve has at the second local maximum point, and
        (d) in the exposing, the first light modulation layer has a reflectivity lower than a reflectivity, which the second curve has at the second local maximum point.

7. The method according to claim 1, wherein:
    the optical address type spatial light modulation device further comprises:
    a third light modulation layer comprising:
        a display layer that reflects a predetermined color upon applied a predetermined threshold voltage or more thereto;

a photoconductive layer that has an optical switching function of absorbing light in a specified wavelength range to change electric characteristics in accordance with an amount of light absorbed, the display layer and the photoconductive layer being stacked on each other; and electrodes on an outer side of the liquid crystal layer and on an outer side of the photoconductive layer, respectively, the specified wavelength ranges of the third light modulation layer is different from those of the first and second light modulation layers, the photoconductive layer of the third light modulation layer comprises:

a pair of charge generating layers; and a charge transporting layer disposed between the charge generating layers, the method further comprising:

exposing the optical address type spatial light modulation device to third imagewise light having a wavelength in the specified wavelength of the third light modulation layer; and applying such a third voltage between the electrodes of the third light modulation layer that a voltage applied to the display layer of the third light modulation layer exceeds a third threshold value, which is the predetermined threshold value of the third light modulation layer upon exposure, and does not exceed the third threshold value upon non-exposure, wherein:

a color of an image written into the third light modulation layer is different from those of images written into the first and second light modulation layers.

8. The method according to claim 7, wherein:

if the third light modulation layer has such a characteristic that a third curve of an intensity of light, which has the same wavelength as the first imagewise light and is applied to the third light modulation layer, versus a reflectivity of the third light modulation layer after finishing applying the light has a third local maximum point, (e) an intensity of the first imagewise light in the exposing is larger than an intensity, which the third curve has at the third local maximum point, and (f) in the exposing, the third light modulation layer has a reflectivity lower than a reflectivity, which the third curve has at the third local maximum point.

9. The method according to claim 8, wherein:

the display layer of the third light modulation layer comprises a liquid crystal layer, which reflects light in the specified wavelength range of the third light modulation layer, the liquid crystal layer comprising a cholesteric liquid crystal, the specified wavelength ranges of the third light modulation layer is different from those of the first and second light modulation layers, the liquid crystal layer of the third light modulation layer transmits light outside the specified wavelength range of the third light modulation layer, and the charge generating layers of the third light modulation layer exhibit impedance symmetry when the photoconductive layer of the third light modulation layer is irradiated with light having a wavelength in the specified wavelength range of the third light modulation layer from a predetermined one surface of the optical address type spatial light modulation device.

10. The method according to claim 1, wherein:

each of the first and second light modulation layers further comprises a light shielding layer between the liquid crystal layer and the photoconductive layer, and each light shielding layer absorbs light in the corresponding specified wavelength range and transmits light outside the corresponding specified wavelength range.

11. The method according to claim 7, wherein:

each of the first to third light modulation layers further comprises a light shielding layer between the liquid crystal layer and the photoconductive layer, and each light shielding layer absorbs light in the corresponding specified wavelength range and transmits light outside the corresponding specified wavelength range.

12. The method according to claim 11, wherein:

the first to third light modulation layers are stacked in this order, and in the exposing of the optical address type spatial light modulation device to the first imagewise light while applying the first voltage, the optical address type spatial light modulation device is irradiated with the first imagewise light from a third-light-modulation-layer side.

13. The method according to claim 1, wherein the photoconductive layers of the first and second light modulation layers absorb light in the respective specified wavelength ranges different from each other and transmit light outside the respective specified wavelength ranges, respectively.

14. A method for driving an optical address type spatial light modulation device to record an image onto the optical address type spatial light modulation device comprising:

a first light modulation layer; and a second light modulation layer, the first and second first light modulation layers stacked on each other, each of the first and second light modulation layers comprising:

a display layer that reflects a predetermined color upon applied a predetermined threshold voltage or more thereto;

a photoconductive layer that has an optical switching function of absorbing light in a specified wavelength range to change electric characteristics in accordance with an amount of light absorbed, the display layer and the photoconductive layer being stacked on each other; and electrodes on an outer side of the display layer and on an outer side of the photoconductive layer, respectively, each photoconductive layer comprising:

a pair of charge generating layers; and a charge transporting layer disposed between the charge generating layers, wherein the photoconductive layers of the first and second light modulation layers are different in the specified wavelength range from the photoconductive layer of the third light modulation layers, the method further comprising:

exposing the optical address type spatial light modulation device to first imagewise light having a wavelength in the specified wavelength range of the first light modulation layer; and applying such a first voltage between the electrodes of the first light modulation layer that a voltage applied to the display layer of the first light modulation layer exceeds a first threshold value, which is the predetermined threshold value of the first light modulation layer upon exposure, and does not exceeds the first threshold value upon non-exposure;

applying a second voltage between the electrodes of the second light modulation layer, wherein:

the exposing and the first and second voltage applying are done at the same time, and if the second light modulation layer has such a characteristic that a first curve of an intensity of light, which has the same wavelength as the first imagewise light and is applied to the second light modulation layer, versus a reflectivity of the second light modulation layer after finishing applying the light has an inflection point, the intensity of the first imagewise light in the exposing is in a vicinity of an intensity, which the first curve has at the inflection point.

15. The method according to claim 14, wherein in the exposing of the optical address type spatial light modulation device to the first imagewise light while applying the first voltage, the optical address type spatial light modulation device is irradiated with the first imagewise light from a second-light-modulation-layer side.

16. The method according to claim 14, wherein:

the display layer of each of the first and second light modulation layers comprises a liquid crystal layer, which reflects light in the corresponding specified wavelength range, the liquid crystal layer comprising a cholesteric liquid crystal, the specified wavelength ranges of the first light modulation layer is different from that of the second light modulation layer, each liquid crystal layer transmitting light outside the corresponding specified wavelength range, and the charge generating layers of each of the first and second light modulation layers exhibit impedance symmetry when the corresponding photoconductive layer is irradiated with light having a wavelength in the corresponding specified wavelength range from a predetermined one surface of the optical address type spatial light modulation device.

17. The method according to claim 14, further comprising:

exposing the optical address type spatial light modulation device to second imagewise light having a wavelength in the specified wavelength of the second light modulation layer, wherein:

the applying of the second voltage applies such the second voltage between the electrodes of the second light modulation layer that a voltage applied to the display layer of the second light modulation layer exceeds a second threshold value, which is the predetermined threshold value of the second light modulation layer upon exposure, and does not exceed the second threshold value upon non-exposure.

18. The method according to claim 17, wherein:

if the first light modulation layer has such a characteristic that a second curve of an intensity of light, which has the same wavelength as the second imagewise light and is applied to the first light modulation layer, versus a reflectivity of the first light modulation layer after finishing applying the light has an inflection point, the intensity of the second imagewise light in the exposing is in a vicinity of an intensity, which the second curve has at the inflection point.

19. An optical image recording apparatus for recording an image onto an optical address type spatial light modulation device, the apparatus comprising:

a first light modulation layer; and a second light modulation layer, the first and second first light modulation layers stacked on each other, wherein:

each of the first and second light modulation layers comprises:

a display layer that reflects a predetermined color upon applied a predetermined threshold voltage or more thereto;

a photoconductive layer that has an optical switching function of absorbing light in a specified wavelength range to change electric characteristics in accordance with an amount of light absorbed, the display layer and the photoconductive layer being stacked on each other; and electrodes on an outer side of the display layer and on an outer side of the photoconductive layer, respectively, each photoconductive layer comprises:

a pair of charge generating layers; and a charge transporting layer disposed between the charge generating layers, and the photoconductive layers of the first and second light modulation layers are different in the specified wavelength range from the photoconductive layer of the third light modulation layers, the apparatus further comprising:

an exposing unit that exposes the optical address type spatial light modulation device to first imagewise light having a wavelength in the specified wavelength range of the first light modulation layer; and a first voltage drive unit that applies such a first voltage between the electrodes of the first light modulation layer that a voltage applied to the display layer of the first light modulation layer exceeds a first threshold value, which is the predetermined threshold value of the first light modulation layer upon exposure, and does not exceeds the first threshold value upon non-exposure;

a second voltage drive unit that applies a second voltage between the electrodes of the second light modulation layer, wherein:

the exposing unit exposes the optical address type spatial light modulation device to the first imagewise light while the first and second voltage drive units are applying the first and second voltages, and if the second light modulation layer has such a characteristic that a first curve of an intensity of light, which has the same wavelength as the first imagewise light and is applied to the second light modulation layer, versus a reflectivity of the second light modulation layer after finishing applying the light has a first local maximum point, (a) an intensity of the first imagewise light in the exposing is larger than an intensity, which the first curve has at the first local maximum point, and (b) in the exposing, the second light modulation layer has a reflectivity lower than a reflectivity, which the first curve has at the first local maximum point.

* * * * *